US008585477B2

(12) United States Patent
Cho et al.

(10) Patent No.: US 8,585,477 B2
(45) Date of Patent: Nov. 19, 2013

(54) VIRTUAL GOLF SIMULATION DEVICE AND METHOD FOR THE SAME

(75) Inventors: Seong In Cho, Seoul (KR); Jae Yoon Ok, Goyang-si (KR)

(73) Assignee: Golfzon Co., Ltd., Daejeon (KR)

(*) Notice: Subject to any disclaimer, the term of this patent is extended or adjusted under 35 U.S.C. 154(b) by 19 days.

(21) Appl. No.: 13/148,245

(22) PCT Filed: Mar. 12, 2010

(86) PCT No.: PCT/KR2010/001557
§ 371 (c)(1),
(2), (4) Date: Aug. 5, 2011

(87) PCT Pub. No.: WO2010/104355
PCT Pub. Date: Sep. 16, 2010

(65) Prior Publication Data
US 2011/0294586 A1    Dec. 1, 2011

(30) Foreign Application Priority Data
Mar. 13, 2009  (KR) .................. 10-2009-0021816
Mar. 13, 2009  (KR) .................. 10-2009-0021819

(51) Int. Cl.
*A63B 67/02* (2006.01)

(52) U.S. Cl.
USPC ................... 463/3; 434/252; 473/156

(58) Field of Classification Search
USPC .............. 473/150–156, 131, 407; 434/1, 252, 434/247; 463/14, 3; 703/6; 704/258; 715/706
See application file for complete search history.

(56) References Cited

U.S. PATENT DOCUMENTS

| | | | |
|---|---|---|---|
| 5,507,485 A * | 4/1996 | Fisher | 473/407 |
| 5,728,006 A * | 3/1998 | Teitell et al. | 473/151 |
| 5,860,648 A * | 1/1999 | Petermeier et al. | 273/108.2 |
| 6,152,856 A * | 11/2000 | Studor et al. | 482/8 |

(Continued)

FOREIGN PATENT DOCUMENTS

| | | |
|---|---|---|
| JP | 06-031021 | 2/1994 |
| KR | 20-1991-0008316 | 10/1991 |
| KR | 20-0240118 | 10/2001 |
| KR | 10-2004-0006379 | 1/2004 |

OTHER PUBLICATIONS

Larsen, Lars Bo, et al., "Development of an automatic pool trainer" Proceedings of the 2005 ACM SIGCHI International Conference on Advances in computer entertainment technology, ACM, 2005.*

(Continued)

*Primary Examiner* — Arthur O. Hall
*Assistant Examiner* — Allen Chan
(74) *Attorney, Agent, or Firm* — Sherr & Jiang, PLLC

(57) ABSTRACT

A virtual golf simulation device and a method for the same are disclosed. The virtual golf simulation device includes a sensor for sensing flight of a ball hit by a golfer, an image processor for processing a simulated image of a virtual golf course and a simulated image of a flight trajectory of the ball sensed by the sensor, a database including a text storing part for storing text data corresponding to predetermined voice guides to determined text data among the text data stored in the text storing part to voice, and a controller for identifying a situation to trigger voice guidance to the golfer, extracting or extracting and combining the predetermined text data, and outputting the extracted or combined text data to the voice converter.

19 Claims, 13 Drawing Sheets

(56) References Cited

U.S. PATENT DOCUMENTS

| | | | |
|---|---|---|---|
| 6,396,041 B1* | 5/2002 | Vock et al. | 250/206.2 |
| 6,774,349 B2* | 8/2004 | Vock et al. | 250/206.1 |
| 6,947,044 B1* | 9/2005 | Kulas | 345/473 |
| 7,441,190 B2* | 10/2008 | Asami | 715/706 |
| 7,494,430 B2* | 2/2009 | Choi | 473/407 |
| 2003/0052914 A1* | 3/2003 | Asami | 345/745 |
| 2005/0227791 A1* | 10/2005 | McCreary et al. | 473/407 |
| 2008/0182685 A1* | 7/2008 | Marty et al. | 473/407 |
| 2008/0207331 A1* | 8/2008 | Beale | 463/42 |
| 2008/0242437 A1* | 10/2008 | Taylor | 473/269 |
| 2009/0191929 A1* | 7/2009 | Nicora | 463/3 |

OTHER PUBLICATIONS

Marriott, Andrew et. al,"VHML-directing a talking head", in Active Media Technology, pp. 90-100, Springer Berlin Heidelberg, 2001.*

Lam, J. "Give Your App an Assistant With the Agent SDK." PC Magazine 17.18 (1998): 259-260.*

Korean Intellectual Property Office, International Search Report for International Application No. PCT/KR2010/001557, Oct. 28, 2010.

Korean Intellectual Property Office, Written Opinion of the International Searching Authority for International Application No. PCT/KR2010/001557, Oct. 28, 2010.

* cited by examiner

VIRTUAL GOLF SIMULATION DEVICE AND METHOD FOR THE SAME

CROSS REFERENCE TO PRIOR APPLICATIONS

This application is a National Stage Patent Application of PCT International Patent Application No. PCT/KR2010/001557 (filed on Mar. 12, 2010) under 35 U.S.C. §371, which claims priority to Korean Patent Application Nos. 10-2009-0021816 (filed on Mar. 13, 2009) and 10-2009-0021819 (filed on Mar. 13, 2009), which are all hereby incorporated by reference in their entirety.

TECHNICAL FIELD

The present invention relates to a virtual golf simulation device and a method for the same, and more particularly, to a virtual golf simulation device and a method for the same, which display graphics and create voice when a golfer plays golf, hitting balls with golf clubs, such that the golfer feels a sense of reality as if he were playing golf on an actual golf course.

BACKGROUND ART

With recent upsurge in interest in playing golf, a virtual golf simulator called "Screen Golf" has gained popularity, which provides a realistic virtual golf simulation so that an indoor golfer feels as if he were enjoying golf on a real golf course.

To offer the same sense of reality that the golfer would feel in a real golf course, the virtual golf simulator simulates actual golf courses and the flight trajectories of balls hit by the golfer, as virtual reality.

DISCLOSURE OF INVENTION

Technical Problem

It is an object of the present invention to provide a virtual golf simulation device and a method for the same, which have high freedom of voice guidance by offering necessary voice guides in individual situations in which a golfer is placed during a golf game, especially various voice guides irrespective of storing capacity, and which identify an individual golfer logged in to a system, provide the golfer with voice guidance customized for the golfer, with his personal characteristics and playing characteristics taken into full account, and provide various voice guides to the golfer, to thereby spur the golfer's interest in golf, increase golfer convenience, and thus boost the performance of the golfer.

Solution to Problem

In accordance with an aspect of the present invention, the above and other objects can be accomplished by the provision of a virtual golf simulation device including a sensor for sensing flight of a ball hit by a golfer, an image processor for processing a simulated image of a virtual golf course and a simulated image of a flight trajectory of the ball sensed by the sensor, a database including a text storing part for storing text data corresponding to predetermined voice guides to provide voice guidance to the golfer, a voice converter for converting predetermined text data among the text data stored in the text storing part to voice, and a controller for identifying a situation to trigger voice guidance to the golfer, extracting or combining the predetermined text data, and outputting the extracted or combined text data to the voice converter.

In accordance with another aspect of the present invention, there is provided a virtual golf simulation device including a sensor for sensing flight of a ball hit by a golfer, an image processor for processing a simulated image of a virtual golf course and a simulated image of a flight trajectory of the ball sensed by the sensor, a database including a golfer data storing part for storing data about individual golfers registered in a system, and a customized voice storing part for storing voice data to provide customized voice guidance to a golfer logged in to the system, a voice processor for adjusting voice data extracted from the customized voice storing part so that the extracted voice data has a predetermined timbre, a predetermined pitch, and a predetermined volume, and a controller for retrieving data about the golfer logged in to the system from the golfer data storing part and providing the customized voice guidance to the golfer according to characteristics of the golfer and a game play of the golfer.

In accordance with another aspect of the present invention, there is provided a virtual golf simulation method for sensing flight of a ball hit by a golfer and simulating the sensed flight of the ball, including determining whether to provide voice guidance to the golfer, extracting or combining predetermined text data from a customized text storing part for storing text data for voice guidance, if it is determined to provide voice guidance to the golfer, and providing the golfer with voice guidance by converting the extracted or combined text data to voice and outputting the voice.

In accordance with a further aspect of the present invention, there is provided a virtual golf simulation method for sensing flight of a ball hit by a golfer and simulating the sensed flight of the ball, including logging in for virtual golf simulation by a golfer, extracting data about the golfer from a golfer data storing part and individually identifying the golfer based on the extracted data, and providing the golfer with customized voice guidance according to a predefined situation or condition in which the golfer is placed during a game.

Advantageous Effects of Invention

In accordance with a virtual golf simulation device and a method for the same according to the present invention, high freedom of voice guidance is ensured by offering necessary voice guides in situations in which a golfer is placed during a golf game, especially various voice guides irrespective of storing capacity. Also, an individual golfer logged in to a system is identified, the golfer is provided with voice guidance customized for the golfer, with his personal characteristics and playing characteristics taken into full account, and various voice guides are given to the golfer. Therefore, the golfer's interest in golf is spurred, the golfer can enjoy golf with more convenience, and thus his performance can be enhanced.

BRIEF DESCRIPTION OF DRAWINGS

The above and other objects, characteristics and other advantages of the present invention will be more clearly understood from the following detailed description taken in conjunction with the accompanying drawings, in which.

BEST MODE FOR CARRYING OUT THE INVENTION

The matters defined in the description such as a detailed construction and specific elements, are provided to assist in a comprehensive understanding of the embodiments of the invention. Accordingly, those of ordinary skill in the art will recognize that various changes and modifications of the embodiments described herein can be made without departing from the scope and spirit of the present invention.

A virtual golf simulation device and a method for the same according to exemplary embodiments of the present invention will be described below in detail.

A description will first be made of the schematic configuration of a virtual golf simulation device according to an exemplary embodiment of the present invention with reference to FIG. 1.

Figure 1:
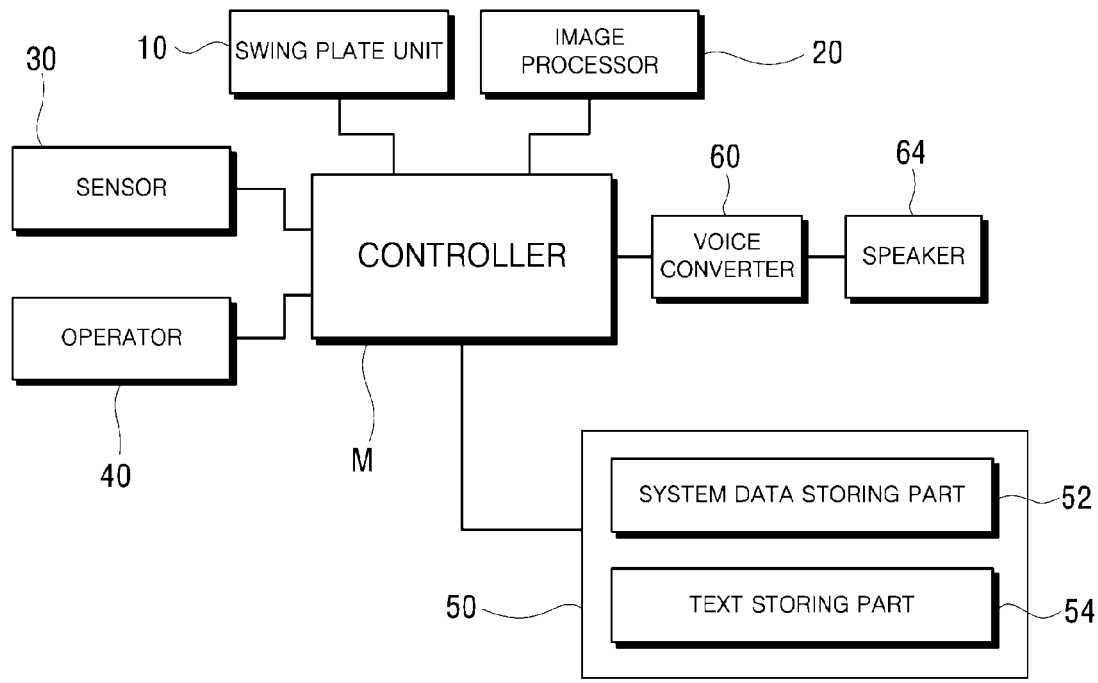
FIG. 1 is a schematic block diagram illustrating the configuration of a virtual golf simulation device according to an exemplary embodiment of the present invention.

Referring to FIG. 1, the virtual golf simulation device according to the exemplary embodiment of the present invention includes a swing plate unit 10, an image processor 20, a sensor unit 30, an operator 40, a Database (DB) 50, and a controller M.

The swing plate unit 10 is prepared for a golfer to hit a ball with a golf club. Preferably, the swing plate unit 10 is inclined at predetermined angles according to the topographical conditions of golf courses.

The image processor 20 projects an image simulating a real golf course, an image simulating the flight of the ball sensed by the sensor unit 30, and other data onto a screen (as used in a so-called screen golf, for example), so that the golfer views them on the screen.

The sensor unit 30 includes a sensor for sensing the velocity, direction, angle, etc. of the ball hit by the golfer and outputting the sensed velocity, direction, angle, etc. to the controller M. Preferably, the sensor unit 30 may include an aiming sensor for sensing an angle at which a golf club hits a ball and an impact point of the ball and a swing sensor for capturing an image of the swing of the golfer so that the captured swing image is analyzed.

The operator 40 is provided to allow the golfer to log in to the system or manipulate the virtual golf simulation device. With the operator 40, the golfer may control the flight direction of the ball and make other manipulations.

The DB 50 includes a system data storing part 52 for storing system data such as image data required for operation of the virtual golf simulation device and playing golf games.

The system data storing part 52 may be configured as an independent storage, or configured such that the system data is stored along with other data in a single storage.

The controller M extracts necessary system data from the system data storing part 52 according to a user manipulation of the operator 40 and operates the virtual golf simulation device based on the extracted system data. The controller M also extracts necessary image-related data from the system data storing part 52 and displays the extracted image-related data visually on a predetermined screen through the image processor 20.

In addition, the controller M constructs an image simulating the flight of a ball based on factors such as the velocity, direction, angle, etc. of the ball sensed by the sensor unit 30 and outputs the image onto the screen through the image processor 20. When needed, the controller M operates the swing plate unit 10.

The virtual golf simulation device illustrated in FIG. 1 characteristically further includes a text storing part 54, a voice converter 60, and a speaker 64.

The text storing part 54 stores voice guides to be given to golfers as text data. The text storing part 54 may be configured as an independent storage for storing text data or configured such that text data is stored along with system data in a single storage.

In other words, the text storing part 54 may be a separate storage for storing text data or a physical part of a single storage, for storing text data.

Since not voice data but text data is stored for voice guidance, more and various text data than voice data may be stored for a limited storage capacity. Accordingly, the freedom of voice guidance may be increased considerably.

The voice converter 60 converts particular text data stored in the text storing part 54 to voice.

The speaker 64 amplifies the converted voice to be audible to a golfer.

When a golfer logs in to the system or is placed in a predefined situation/condition during a game after the log-in, the controller M extracts text data with which to provide a specific voice guide to the golfer in the predefined situation/condition from the text storing part 54 or combines the extracted data, the voice converter 60 converts the text data received from the controller M to voice, and the speaker 64 outputs the voice.

The voice converter 60 may selectively convert the extracted or combined text data to one of a plurality of voices each having a predetermined timbre, pitch and volume.

For example, the extracted text data may be converted to the voice of a celebrity.

Detailed exemplary embodiments of a virtual simulation method for voice guidance will be described later.

Another exemplary embodiment of the virtual golf simulation device according to the present invention will be described below with reference to FIG. 2.

Figure 2:
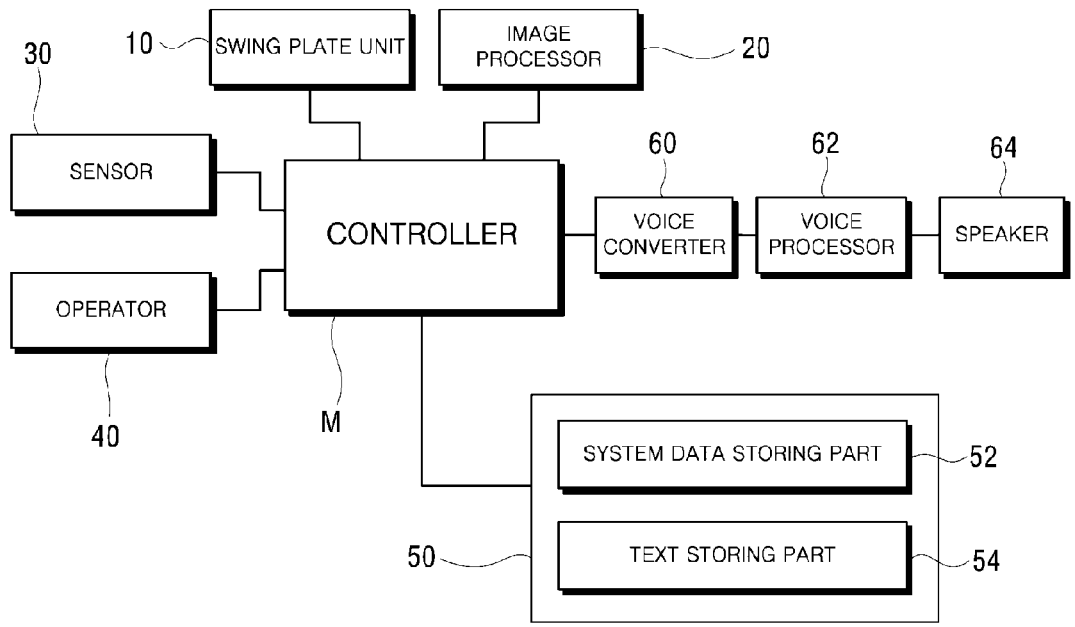
FIG. 2 is a schematic block diagram illustrating the configuration of a virtual golf simulation device according to another exemplary embodiment of the present invention.

The exemplary embodiments illustrated in FIGS. 1 and 2 are basically identical in terms of the configurations and operations of the swing plate unit 10, the image processor 20, the sensor unit 30, the operator 40, the DB 50, and the controller M, whereas they differ in that the virtual golf simulation device illustrated in FIG. 2 includes a voice processor 62 interposed between the voice converter 60 and the speaker 64 in addition to the components of FIG. 1.

To avoid redundant description of the substantially same components between the virtual golf simulation devices illustrated in FIGS. 1 and 2, different characteristics in configuration will be focused on in the following description.

The voice processor 62 adjusts the voice converted by the voice converter 60 so that the voice may take predetermined voice features, that is, a predetermined timbre, pitch and volume.

That is, particular text data extracted from the text storing part 54 according to a predefined situation identified by the controller M are converted to voice in the voice converter 60, adjusted to take a predetermined timbre, pitch and volume in the voice processor 62, and then output through the speaker 64.

For example, if a voice guidance service is provided to each golfer by a different voice, the voice is output to the golfer after adjustment in the voice processor 62.

Even for a golfer, different kinds of voices may be used depending on situations. Thus a voice guide may be given to the golfer by a normal or humorous voice after voice adjustment.

While the voice converter 60 and the voice processor 62 are shown to be separately configured from each other, they may be incorporated into a single voice converter.

An exemplary embodiment of a virtual golf simulation method for voice guidance in the virtual golf simulation device illustrated in FIG. 2 will be described later in detail.

Another exemplary embodiment of the virtual golf simulation device according to the present invention will be described below with reference to FIG. 3.

Figure 3:
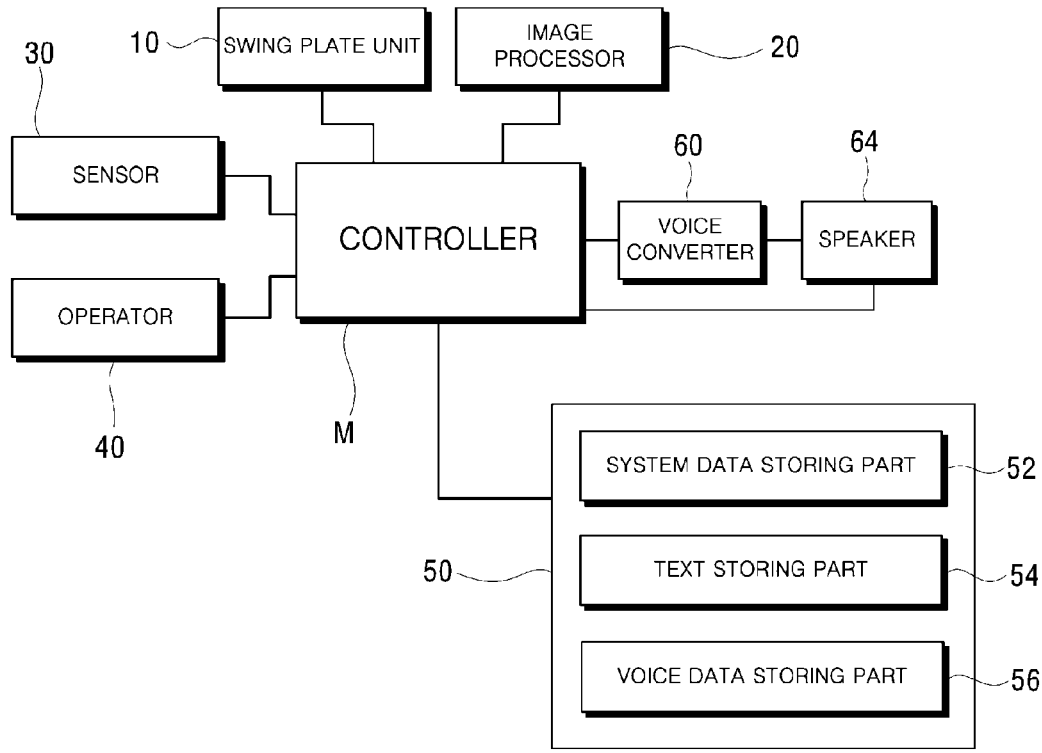
FIG. 3 is a schematic block diagram illustrating the configuration of a virtual golf simulation device according to another exemplary embodiment of the present invention.

The exemplary embodiments illustrated in FIGS. 1 and 3 are basically identical in terms of the configurations and operations of the swing plate unit 10, the image processor 20, the sensor unit 30, the operator 40, the DB 50, and the controller M, whereas they differ in terms of the configuration of the DB 50 and a connection relationship among the controller M, the voice converter 60, and the speaker 64.

To avoid redundant description of the substantially same components between the virtual golf simulation devices illustrated in FIGS. 1 and 3, different characteristics in configuration will be focused on in the following description.

Referring to FIG. 3, the DB 50 further includes a voice data storing part 56 in addition to the system data storing part 52 and the text storing part 54.

The voice data storing part 56 stores voice data for predetermined voices. The voice data storing part 56 may be configured as an independent storage for storing voice data or configured such that voice data is stored along with system data and text data in a single storage.

In other words, the voice data storing part 56 may be a separate storage for storing text data or a physical part of a single storage, for storing voice data.

In accordance with an exemplary embodiment, two types of voice guidance are defined in the virtual golf simulation device, general voice guidance and customized voice guidance. The general voice guidance involves outputting voice corresponding to voice data stored in the voice data storing part 56, whereas the customized voice guidance involves converting text data stored in the text storing part 54 to voice by the voice converter 60 and then outputting the converted voice.

The general voice guidance is intended to give a specific voice guide to a golfer irrespective of the progress of a game that the golfer is playing. Compared to the general voice guidance, the customized voice guidance aims to give a voice guide customized for a golfer in a particular situation, taking into account characteristics, play style, and other data of the individual golfer.

For example, the general voice guidance service provides a golfer with a welcome greeting "Welcome to ○○○", upon his log-in to the system, a greeting "Have a nice rounding!", or a notification "Loading. Please wait.", by voice messages.

The customized voice guidance service provides a golfer with greetings or advice in situations that the golfer may be placed during a game, for example, a greeting "It's 20 days since I saw you last time." upon his log-in or a voice guide "○○○, hit a bunker shot, please. Your driving distance will be reduced by 40%".

In the customized voice guidance service, a current record of a golfer may be announced like "○○○, you scored ○○ now" or "○○○, you have ○○ meters (yards) to go". When the golfer makes a birdie or eagle, a congratulation may be given to the golfer by saying "○○○, your first birdie in the game!" or "○○○, you recorded your first birdie!".

Voice guides that are issued in the general voice guidance service are usually common to all golfers that play games, whereas voice guides are customized for situations in which individual golfers are placed in the customized voice guidance service.

Accordingly, voice data corresponding to regular voice guides as given in the general voice guidance service are stored in the voice data storing part 56 and when needed, they are output directly through the speaker 64 by voice. On the other hand, in the case where a different voice message or a different type of voice is required for each golfer as in the customized voice guidance service, text data specific to each situation are stored in the text storing part 54. Then when needed, text data is extracted from the text storing part 54 or the extracted text data is combined, and the extracted or combined text data is converted to the voice and output through the speaker 64.

An exemplary embodiment of a virtual golf simulation method for voice guidance in the virtual golf simulation device illustrated in FIG. 3 will be described later in detail.

Another exemplary embodiment of the virtual golf simulation device according to the present invention will be described below with reference to FIG. 4.

Figure 4:
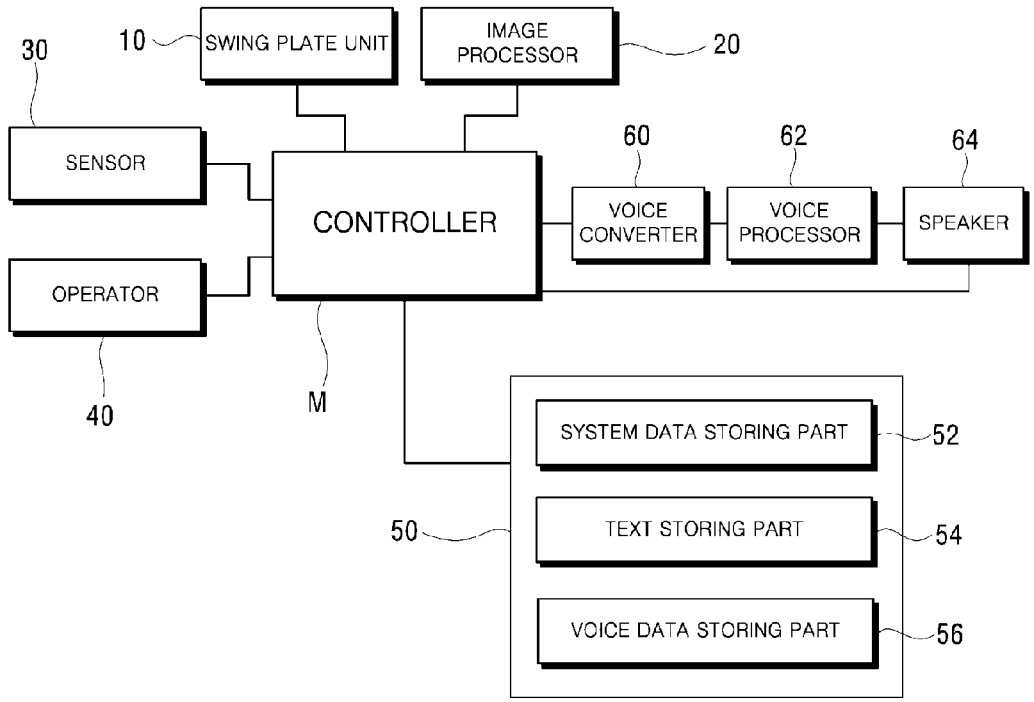
FIG. 4 is a schematic block diagram illustrating the configuration of a virtual golf simulation device according to another exemplary embodiment of the present invention.

The exemplary embodiments illustrated in FIGS. 3 and 4 are basically identical in terms of the configurations and operations of the swing plate unit 10, the image processor 20, the sensor unit 30, the operator 40, the DB 50, and the controller M, whereas they differ in that the voice processor 62 is interposed between the voice converter 60 and the speaker 64 in the virtual golf simulation device of FIG. 4.

To avoid redundant description of the substantially same components between the virtual golf simulation devices illustrated in FIGS. 3 and 4, different characteristics in configuration will be focused on in the following description.

Referring to FIG. 4, the voice processor 62 adjusts voice converted by the voice converter 60 so that the voice may take predetermined voice features, that is, a predetermined timbre, pitch and volume.

That is, particular text data extracted from the text storing part 54 according to a predefined situation identified by the controller M are converted to voice in the voice converter 60, adjusted to take a predetermined timbre, pitch and volume in the voice processor 62, and then output through the speaker 64.

For example, if a voice guidance service is provided to each golfer by a different voice, the voice is output to the golfer after adjustment in the voice processor 62.

Even for a golfer, different kinds of voices may be used depending on situations. Thus a voice guide may be given to the golfer by a normal or humorous voice after voice adjustment.

An exemplary embodiment of a virtual golf simulation method for voice guidance in the virtual golf simulation device illustrated in FIG. 4 will be described later in detail.

Figure 5:
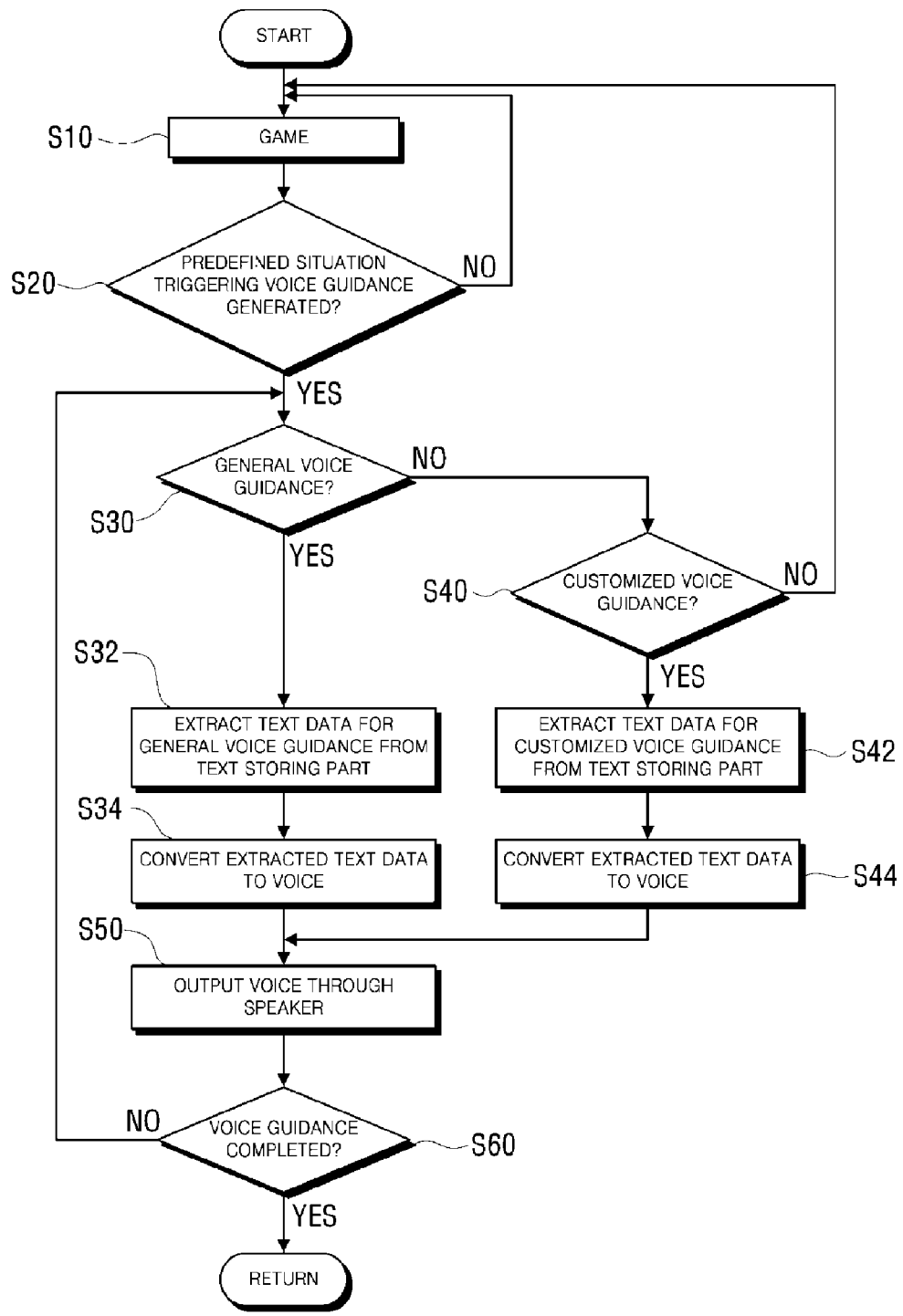
FIG. 5 is a flowchart illustrating a virtual golf simulation method in the virtual simulation device illustrated in FIG. 1 according to an exemplary embodiment of the present invention.

With reference to FIG. 5, a description will be made of a virtual golf simulation method that is performed in the virtual golf simulation device illustrated in FIG. 1 according to an exemplary embodiment of the present invention.

Referring to FIG. 5, as a game proceeds in step S10, the controller determines whether a golfer is placed in a predefined situation in step S20.

Upon generation of a predefined situation, the controller determines whether the predefined situation requires the general voice guidance in step S30 or the customized voice guidance in step S40.

If the predefined situation triggers the general voice guidance in step S30, the controller extracts text data for use in the general voice guidance from the text storing part in step S32. In step S34, the controller transmits the extracted text data to the voice converter and the voice converter converts the text data to voice in step S34. The voice is amplified and output through the speaker in step S50.

On the other hand, if the predefined situation triggers the customized voice guidance in step S40, the controller extracts text data for use in the customized voice guidance from the text storing part in step S42.

The controller may extract the text data from among text data classified for respective predefined situations or extract and combine the text data.

In step S44, the controller transmits the extracted text data to the voice converter and the voice converter converts the text data to voice.

The text-to-voice conversion may be carried out in such a manner that the voice takes a different voice feature, for example, at least one of a different timbre, pitch and volume. In this manner, voice guidance may be provided to each golfer by a different voice.

The voice is amplified and output through the speaker in step S50.

The controller determines whether the voice guidance has been completed in step S60. Upon completion of the voice guidance, the procedure goes to the next step. If the voice guidance is still going on, the procedure returns to step S30 or S40.

While the controller makes a distinction between general voice guidance and customized voice guidance in the exemplary embodiment of the present invention, it may be further contemplated that when a predefined situation triggers voice guidance, the controller extracts or extracts and combines text data corresponding to a voice guide suitable for the predefined situation, converts the extracted or combined text data to voice, and outputs the voice, irrespective of the general or customized voice guidance.

Figure 6:
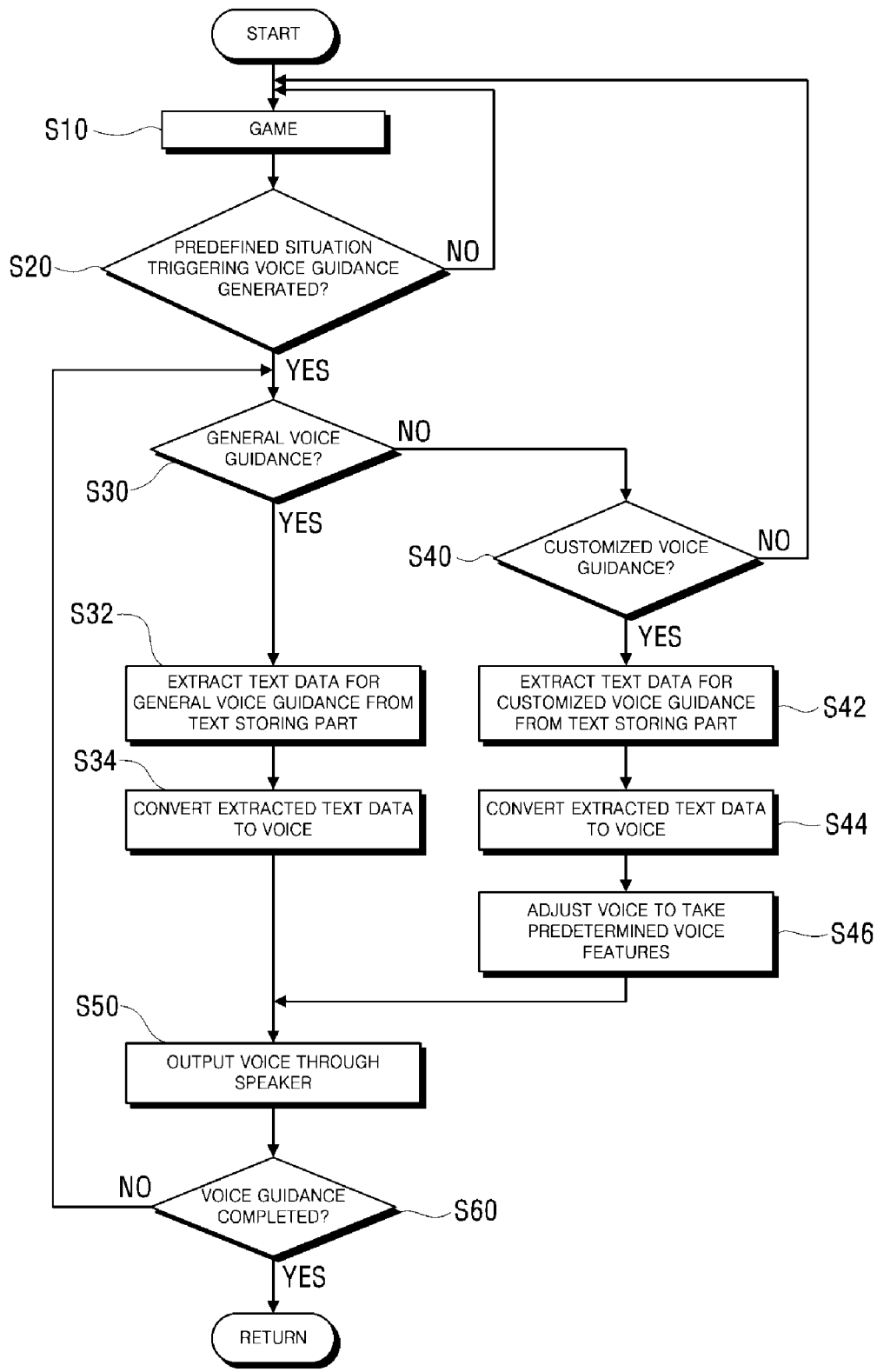
FIG. 6 is a flowchart illustrating a virtual golf simulation method in the virtual simulation device illustrated in FIG. 2 according to an exemplary embodiment of the present invention.

With reference to FIG. 6, a description will be made of a virtual golf simulation method that is performed in the virtual golf simulation device illustrated in FIG. 2 according to an exemplary embodiment of the present invention.

Referring to FIG. 6, as a game proceeds in step S10, the controller determines whether a golfer is placed in a predefined situation in step S20.

Upon generation of a predefined situation, the controller determines whether the predefined situation requires the general voice guidance in step S30 or the customized voice guidance in step S40.

If the predefined situation triggers the general voice guidance in step S30, the controller extracts text data for use in the general voice guidance from the text storing part in step S32. In step S34, the controller transmits the extracted text data to the voice converter and the voice converter converts the text data to voice. The voice is amplified and output through the speaker in step S50.

On the other hand, if the predefined situation triggers the customized voice guidance in step S40, the controller extracts text data for use in the customized voice guidance from the text storing part in step S42.

The controller may extract the text data from among text data classified by predefined situations or extract and combine the text.

In step S44, the controller transmits the extracted text data to the voice converter and the voice converter converts the text data to voice.

In step S46, the voice is adjusted to take predetermined voice features, that is, a predetermined timbre, pitch and volume. In this manner, customized voice guidance may be provided to each golfer by a different voice.

The adjusted voice is amplified and output through the speaker in step S50.

The controller determines whether the voice guidance has been completed in step S60. Upon completion of the voice guidance, the procedure goes to the next step. If the voice guidance is still going on, the procedure returns to step S30 or S40.

Figure 7:
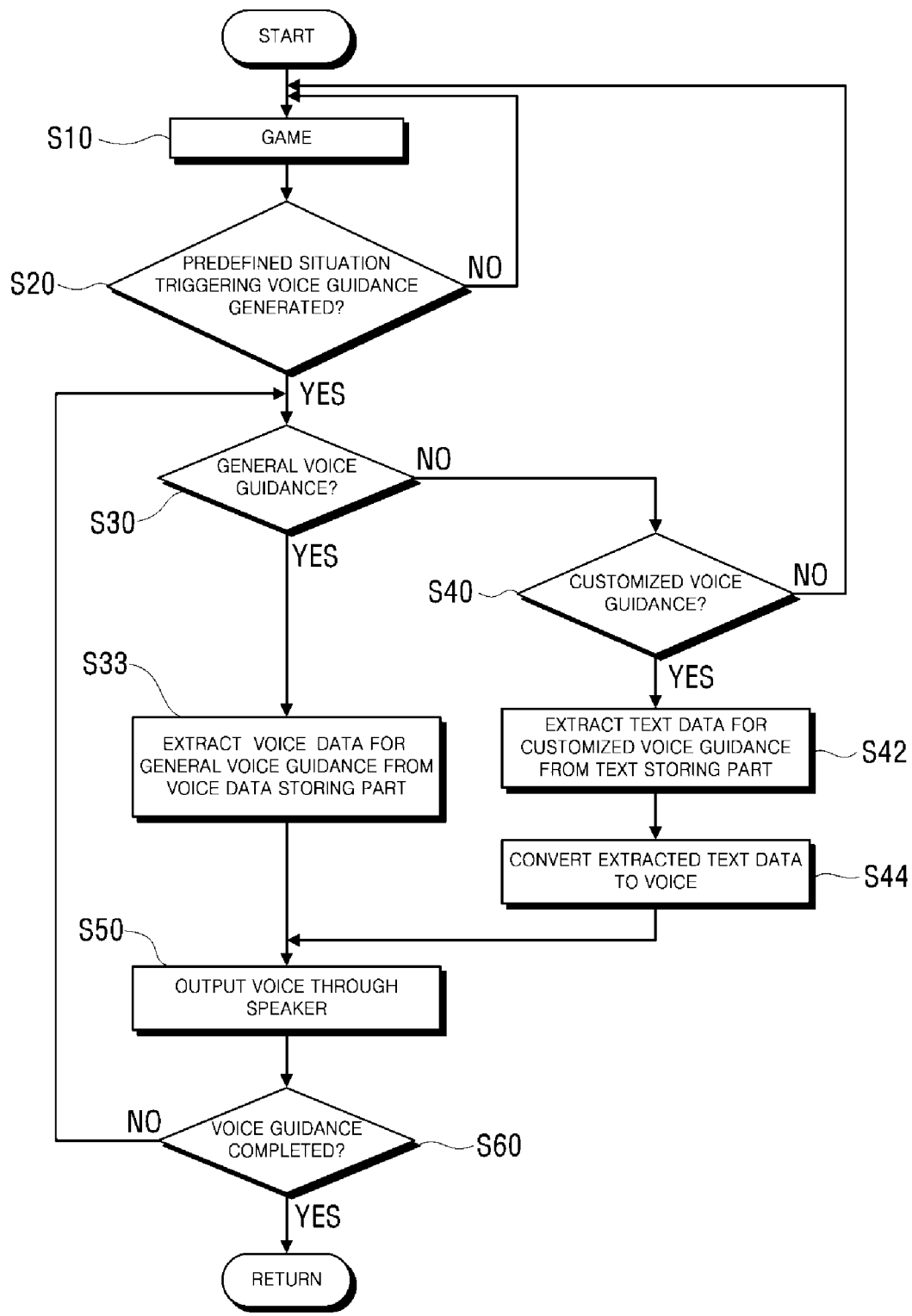
FIG. 7 is a flowchart illustrating a virtual golf simulation method in the virtual simulation device illustrated in FIG. 3 according to an exemplary embodiment of the present invention.

With reference to FIG. 7, a description will be made of a virtual golf simulation method that is performed in the virtual golf simulation device illustrated in FIG. 3 according to an exemplary embodiment of the present invention.

Referring to FIG. 7, as a game proceeds in step S10, the controller determines whether a golfer is placed in a predefined situation in step S20.

Upon generation of a predefined situation, the controller determines whether the predefined situation requires the general voice guidance in step S30 or the customized voice guidance in step S40.

If the predefined situation triggers the general voice guidance in step S30, the controller extracts voice data for use in the general voice guidance from the voice data storing part in step S33. The voice data is amplified and output through the speaker by voice in step S50.

On the other hand, if the predefined situation triggers the customized voice guidance in step S40, the controller extracts text data for use in the customized voice guidance from the text storing part in step S42.

The controller may extract the text data from among text data classified by predefined situations or extract and combine the text data.

In step S44, the controller transmits the extracted text data to the voice converter and the voice converter converts the text data to voice.

The text-to-voice conversion may be carried out in such a manner that the voice takes a different voice feature, for example, at least one of a different timbre, pitch and volume. In this manner, voice guidance may be provided to each golfer by a different voice.

The converted voice is amplified and output through the speaker in step S50.

The controller determines whether the voice guidance has been completed in step S60. Upon completion of the voice guidance, the procedure goes to the next step. If the voice guidance is still going on, the procedure returns to step S30 or S40.

Figure 8:
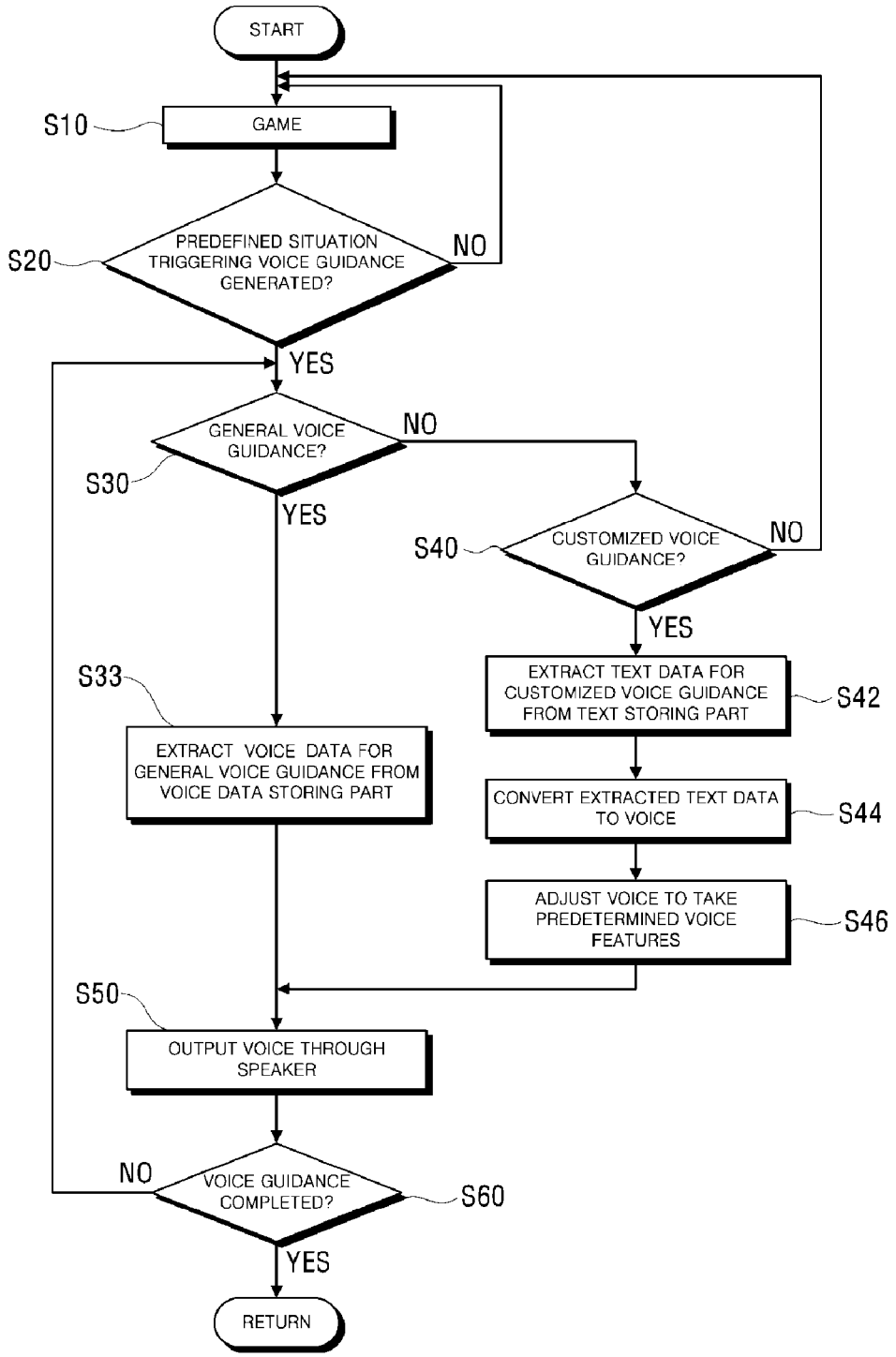
FIG. 8 is a flowchart illustrating a virtual golf simulation method in the virtual simulation device illustrated in FIG. 4 according to an exemplary embodiment of the present invention.

With reference to FIG. 8, a description will be made of a virtual golf simulation method that is performed in the virtual golf simulation device illustrated in FIG. 4 according to an exemplary embodiment of the present invention.

Referring to FIG. 8, as a game proceeds in step S10, the controller determines whether a golfer is placed in a predefined situation in step S20.

Upon generation of a predefined situation, the controller determines whether the predefined situation requires the general voice guidance in step S30 or the customized voice guidance in step S40.

If the predefined situation triggers the general voice guidance in step S30, the controller extracts voice data for use in the general voice guidance from the voice data storing part in step S33. The voice data is amplified and output through the speaker by voice in step S50.

On the other hand, if the predefined situation triggers the customized voice guidance in step S40, the controller extracts text data for use in the customized voice guidance from the text storing part in step S42.

The controller may extract the text data from among text data classified by predefined situations or extract and combine the text data.

In step S44, the controller transmits the extracted text data to the voice converter and the voice converter converts the text data to voice.

In step S46, the voice is adjusted to take predetermined voice features, that is, a predetermined timbre, pitch and volume. In this manner, customized voice guidance may be provided to each golfer by a different voice.

The adjusted voice is amplified and output through the speaker in step S50.

The controller determines whether the voice guidance has been completed in step S60. Upon completion of the voice guidance, the procedure goes to the next step. If the voice guidance is still going on, the procedure returns to step S30 or S40.

When a voice guide is given to a golfer, it is preferable that text data corresponding to the voice guide, extracted from the text storing part 54 or text data corresponding to the voice guide, extracted from the text storing part 54 and combined are visually displayed on the screen through the image processor 20, while outputting the extracted or combined text data by voice, so that the golfer may view the text of the voice on the screen in each of the virtual golf simulation devices according to the exemplary embodiments of the present invention illustrated in FIGS. 1 to 4.

Even when voice data is extracted from the voice data storing part 56 to give a voice guide, it is also possible to create text data corresponding to the voice guide and visually display the text data on the screen through the image processor 20.

Another exemplary embodiment of the virtual golf simulation device according to the present invention will be described below with reference to FIG. 9.

Figure 9:
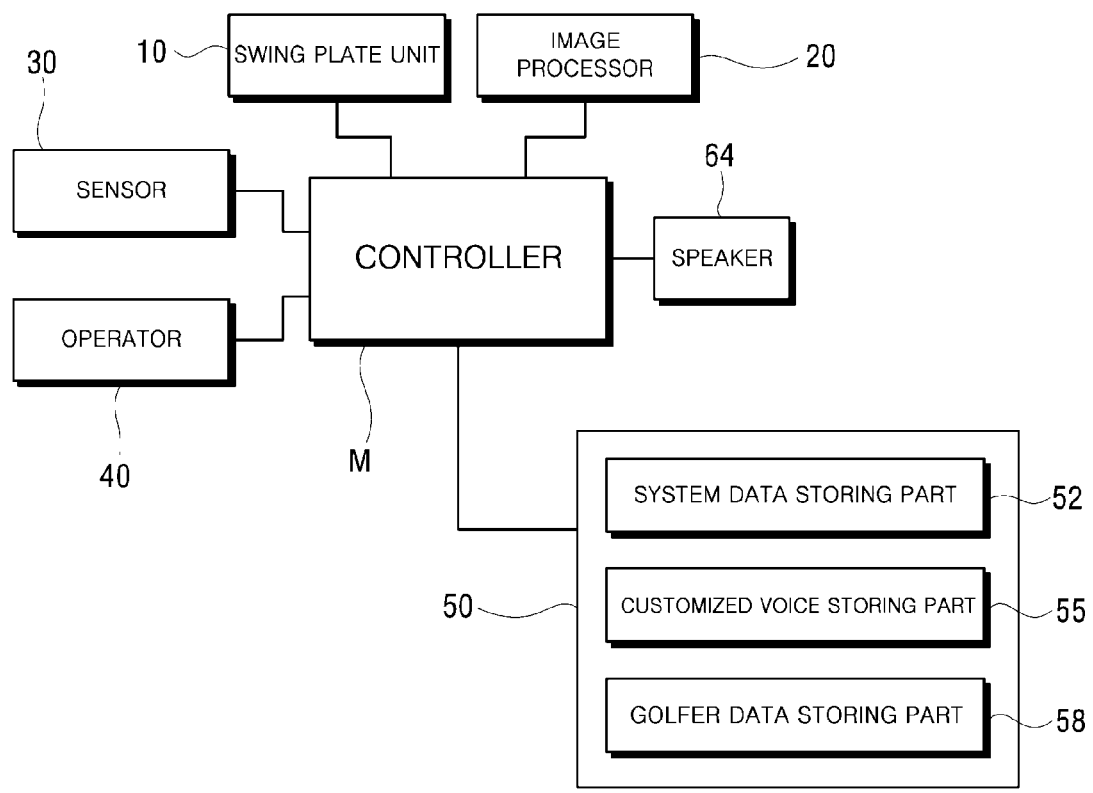
FIG. 9 is a schematic block diagram illustrating the configuration of a virtual golf simulation device according to an exemplary embodiment of the present invention.

The exemplary embodiments illustrated in FIGS. 1 and 9 are basically identical in terms of the configurations and operations of the swing plate unit 10, the image processor 20, the sensor unit 30, the operator 40, and the controller M, whereas they differ in terms of the configuration of the DB 50 and a voice output configuration.

To avoid redundant description of the substantially same components between the virtual golf simulation devices illustrated in FIGS. 1 and 9, different characteristics in configuration will be focused on in the following description.

Referring to FIG. 9, the DB 50 includes the system data storing part 52, a customized voice storing part 55, and a golfer data storing part 58.

The customized voice storing part 55 stores voice data for customized voice guidance that is provided in predefined situations/conditions.

The voice data may be stored as completed sentences suitable for the individual predefined situations/conditions. Alternatively or additionally, the voice data may be stored as words such that certain words are combined into a sentence and output by voice under a predefined situation/condition.

The customized voice storing part 55 may be a separate storage for storing voice data or as a physical part of a single storage, for storing voice data.

The golfer data storing part 58 stores personal data, record data, and data about other playing characteristics of individual golfers registered in the system.

If a golfer signs up as a member to use the virtual golf simulation device and has his data registered to the system, the registered data is stored in the golfer data storing part 58.

Preferably, as the golfer plays golf games, every data about the golfer such as data about his records in the golf games and data about his playing characteristics is stored in the golfer data storing part 58.

The golfer data storing part 58 may be a separate storage from other storing parts or as a physical part of a single storage, for storing golfer data.

If a golfer is placed in a predefined situation/condition during playing golf, the controller M analyzes the personal characteristics, record characteristics, and playing characteristics of the golfer based on golfer data about the golfer stored in the golfer data storing part 58, extracts necessary voice data from the customized voice storing part 55 based on the analysis, and outputs the extracted voice data through the speaker 64, so that customized voice guidance is provided to the golfer.

How the customized voice guidance is provided to the golfer will be described later in detail.

Another exemplary embodiment of the virtual golf simulation device according to the present invention will be described below with reference to FIG. 10.

Figure 10:
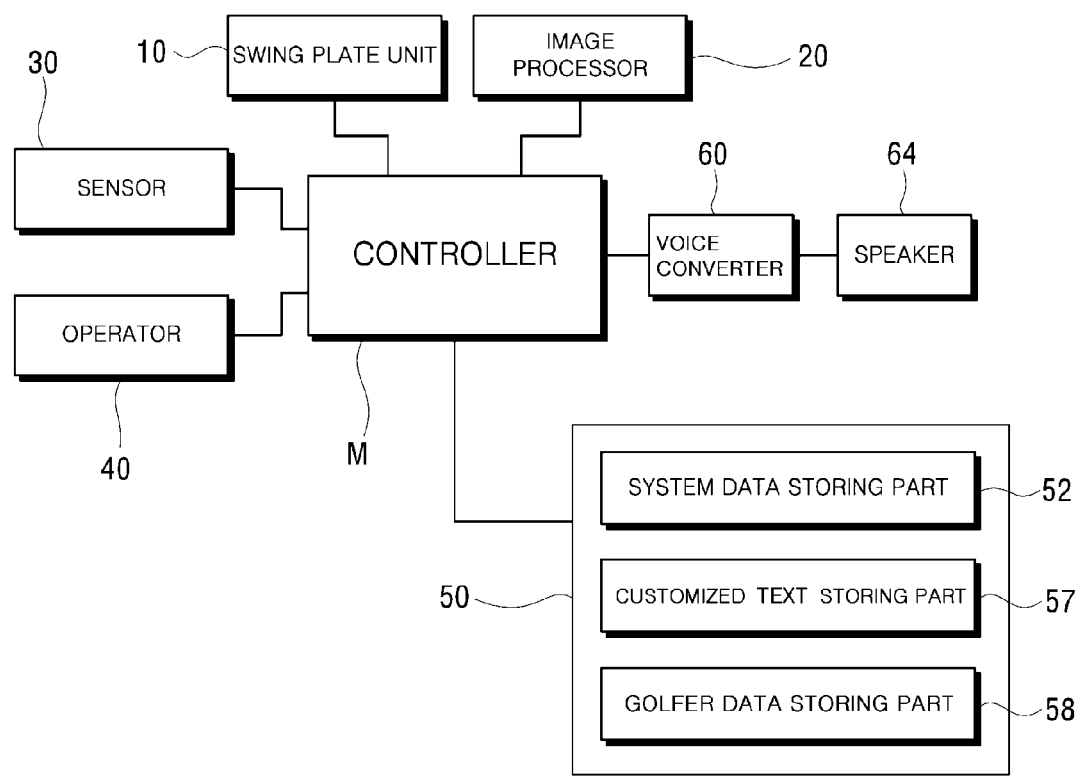
FIG. 10 is a schematic block diagram illustrating the configuration of a virtual golf simulation device according to another exemplary embodiment of the present invention.

The exemplary embodiments illustrated in FIGS. 9 and 10 are basically identical in terms of the configurations and operations of the swing plate unit 10, the image processor 20, the sensor unit 30, the operator 40, the DB 50, and the controller M, whereas they differ in that the visual golf simulation device illustrated in FIG. 10 includes a customized text storing part 57 instead of the customized voice storing part 55 and further includes the voice converter 60.

To avoid redundant description of the substantially same components between the virtual golf simulation devices illustrated in FIGS. 9 and 10, different characteristics in configuration will be focused on in the following description.

The customized text storing part 57 stores text data for customized voice guidance that is provided in predefined situations/conditions.

The text data may be stored as completed sentences suitable for the individual predefined situations/conditions. Alternatively or additionally, the text data may be stored as words such that certain words are combined into a sentence and output by voice under a predefined situation/condition.

The text data storing part 57 may be a separate storage for storing text data or as a physical part of a single storage, for storing text data.

The voice converter 60 converts particular text data stored in the customized text storing part 57 to voice.

When a golfer logs in to the system or is placed in a predefined situation/condition during a game after the log-in, the controller M analyzes the personal characteristics, record characteristics, and playing characteristics of the golfer based on golfer data about the golfer stored in the golfer data storing part 58, extracts necessary text data from the customized text storing part 57 based on the analysis, and outputs the extracted text data to the voice converter 60. Then the voice converter 60 converts the text data to voice and the speaker 64 outputs the voice. Thus customized voice guidance is provided to the golfer.

The voice converter 60 may also adjust the voice to take a predetermined timbre, pitch and volume during the text-to-voice conversion.

That is, particular text data extracted from the customized text storing part 57 according to a predefined situation identified by the controller M are converted to voice in such a manner that the voice takes a predetermined timbre, pitch and volume in the voice converter 60, and then output through the speaker 64.

How the customized voice guidance is provided to the golfer will be described later in detail.

A further exemplary embodiment of the virtual golf simulation device according to the present invention will be described below with reference to FIG. 11.

Figure 11:
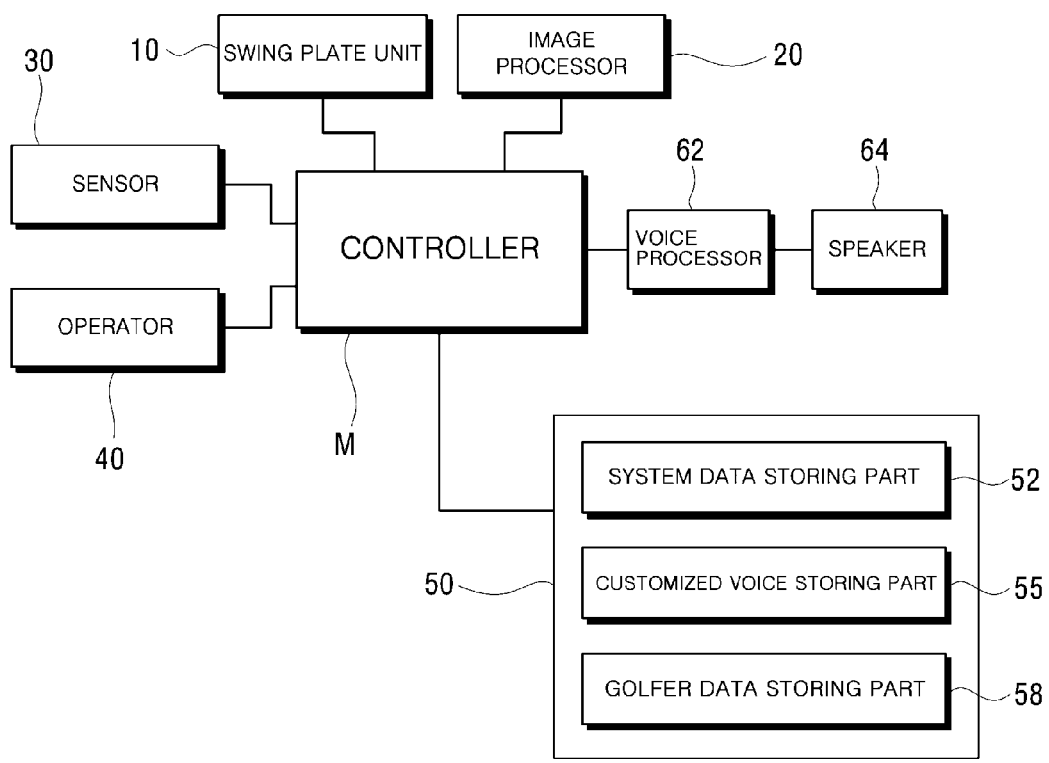
FIG. 11 is a schematic block diagram illustrating the configuration of a virtual golf simulation device according to a further exemplary embodiment of the present invention.

The exemplary embodiments illustrated in FIGS. 9 and 11 are basically identical in terms of the configurations and operations of the swing plate unit 10, the image processor 20, the sensor unit 30, the operator 40, the DB 50, and the controller M, whereas they differ in that the visual golf simulation device illustrated in FIG. 11 further includes the voice processor 62 in addition to the components of FIG. 9.

To avoid redundant description of the substantially same components between the virtual golf simulation devices illustrated in FIGS. 9 and 11, different characteristics in configuration will be focused on in the following description.

The voice processor 62 adjusts voice data stored in the customized voice storing part 55 so that the voice data may take predetermined voice features, that is, a predetermined timbre, pitch and volume.

That is, particular voice data extracted from the customized voice storing part 55 according to a predefined situation identified by the controller M are adjusted to take a predetermined timbre, pitch and volume in the voice processor 62, and then output through the speaker 64.

How the customized voice guidance is provided to the golfer will be described later in detail.

Predefined situations/conditions in which a golfer may be placed from log-in to the system through a game play to the end of the game play will be described below in detail.

TABLE 1

| situation | condition | voice announcement |
|---|---|---|
| Log-in | Within 7 days | <Nickname>, have a nice rounding! |
| | | <Nickname>, I am wishing you a hole in one! |
| | From 7 to 30 days | <Nickname>, I haven't seen you for <the number of days since the last log-in> days. Glad to see you again. |
| | After 30 days | Long time no see. Have a nice rounding. <Nickname>, have a nice rounding. |
| Birdie | First of all games | Wow, congratulations on your first birdie! |
| | First in the game | First birdie, today |
| Hole-in-one | First of all games | Wow, congratulations on your first hole-in-one! |
| Albatross | First of all games | Wow, congratulations on your first albatross! |
| Eagle | First of all games | Wow, congratulations on your first eagle! |
| End of the game(least score) | Least score | Wow, you have scored the least points. Congratulations! |
| | Least score ≤100 | Wow, you are now a 100-player! |
| | Least score ≤90 | Congratulations! You are now a bogey player. |
| | Least score ≤80 | Congratulations! You have broken 80. |
| | Least score ≤72 | Wow, you shot even par. Congratulations! |
| | Least score ≤71 | Wow, you shot under par. Congratulations! Congratulations on your first under par! |
| | Least score ≤64 | Wow, you did a good job. You have scored the least points. |
| End of the game(average score) | +15 points below average score | The course must have been very tough. |
| | +10 points below average score | You must have been in bad shape. I hope you will score better next time. Don't let yourself down. Cheer up! |

TABLE 1-continued

| situation | condition | voice announcement |
|---|---|---|
| | Between +10 and −10 points from average score | Not so bad. You played well as usual. You are still a good player. |
| | Not the least score. −10 points below average score | I'm sure you must have practiced a lot. You did well! |

TABLE 2

| situation | condition | voice announcement |
|---|---|---|
| Starting each hole | | This is a <remaining distance> m <the number of shots for par> -par hole. |
| Shot | Green bunker | The driving distance will be reduced by 40%. |
| | Fairway bunker | The driving distance will be reduced by 20%. |
| | Rough | The driving distance will be reduced by 10%. You have <remaining distance> meters to go. |
| | Wind speed of 5 m/s or above | Wind is strong ahead/behind/from the left/ from the right. Be careful! |
| Putting | 10 cm or above in height from the hole cup | It is an uphill/downhill. |
| Passing the hole cup | When the ball rolls 20 cm or nearer to the hole cup and then passes the hole cup (30 cm or below from the ground) | So sorry about that. |

[Table 1] and [Table 2] list predefined situations in which golfers may be placed from their log-in to the end of a game through the game, predefined conditions that may be set under each situation, and voice guides suitable for the predefined conditions of each situation.

A voice guide may be given to a golfer under a specific situation, irrespective of conditions, or in a specific condition of a specific situation. If a plurality of conditions are defined for a specific situation, the plurality of conditions are prioritized and thus when the plurality of conditions are generated simultaneously, voice guidance may be provided according to their priority levels.

It may further be contemplated that voice guides spoken by different voices are stored for each predefined situation/condition and the same voice guide is issued to different golfers under the same situation/condition by different voices.

If a golfer is placed in a predefined situation/condition, it is preferable that the controller M analyzes at least one of data retrieved from the golfer data storing part, data about the golfer's strokes sensed by the sensor, data retrieved from the system data storing part that stores system data in relation to golf courses and rounding environments, data sensed about swings of the golfer, data sensed about the impact state of a ball, and data about an environment changed by a manipulation of the operator, and provides voice guidance to the golfer based on the analysis according to the predefined situation/ condition.

With reference to FIGS. 12 to 15, virtual golf simulation methods that are performed in the virtual golf simulation devices illustrated in FIGS. 9, 10 and 11 according to the present invention will be described below.

Figure 12:
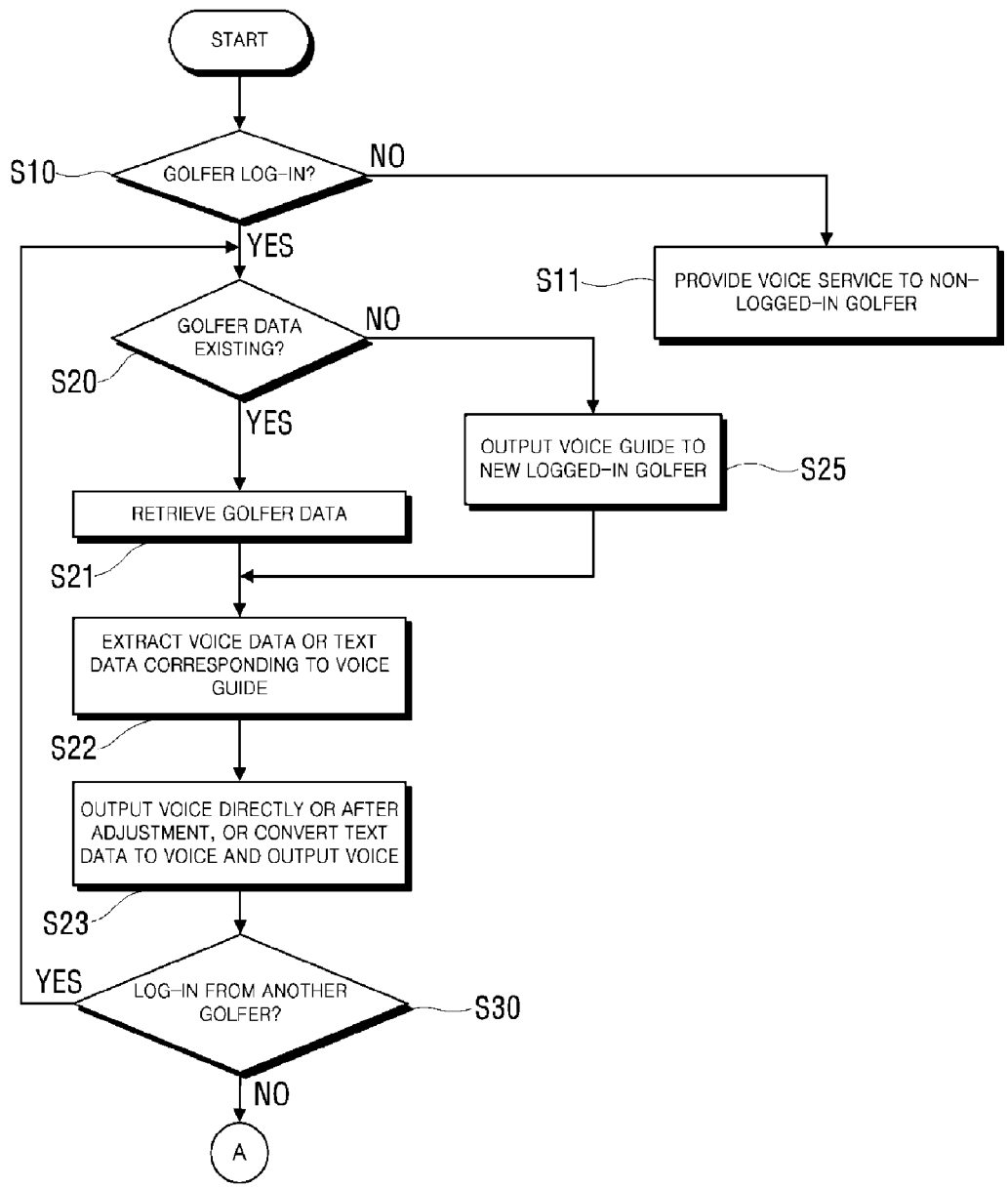
FIGS. 12 and 13 are flowcharts illustrating a virtual golf simulation method according to an exemplary embodiment of the present invention.
Figure 13:
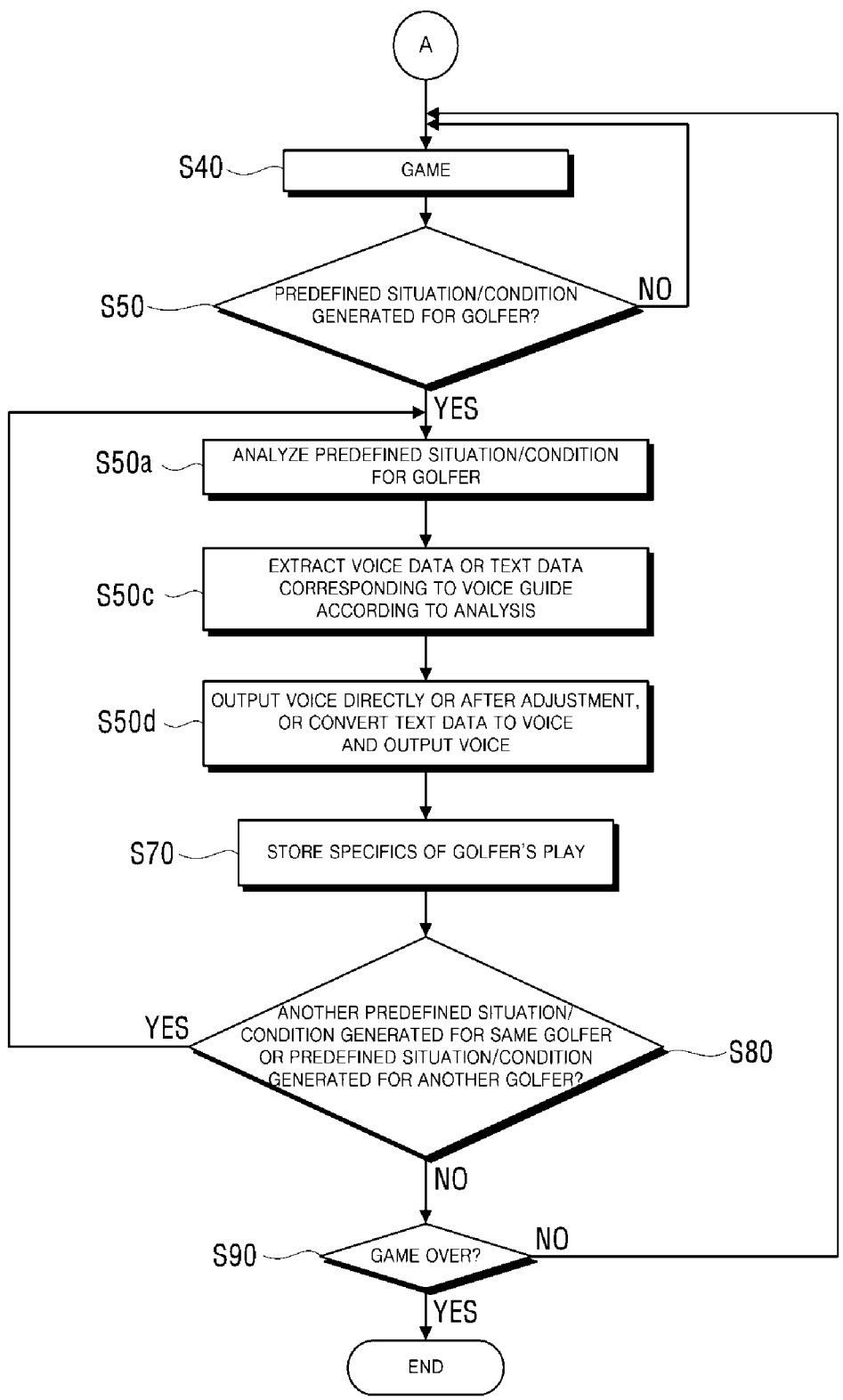

A description will first be made of a virtual golf simulation method according to an exemplary embodiment of the present invention with reference to FIGS. 12 and 13. In FIGS. 12 and 13, reference character A represents connection between the flowcharts illustrated in FIGS. 12 and 13.

Referring to FIG. 12, the controller determines whether a golfer has logged in to the system in step S10.

If the golfer has not logged in to the system, the controller preferably provides a predetermined voice message to the non-logged-in golfer in step S11.

If the golfer has logged in to the system, the controller determines whether there exists data about the logged-in golfer, referring to the data stored in the golfer data storing part, in step S20.

In the absence of any data about the logged-in golfer in the golfer data storing part or in case of the golfer's initial game after registration to the system, the controller preferably provides a preset voice guide to the new golfer in step S25.

On the other hand, in the presence of data about the logged-in golfer in the golfer data storing part, the data about the logged-in golfer are extracted from the golfer data storing part and output to the controller in step S21.

Thus the controller identifies the golfer based on the received golfer data.

After identifying the golfer, the controller extracts or extracts and combines voice data from the customized voice storing part or extracts or extracts and combines text data from the customized text storing part in step S22.

The extracted or combined voice data is output through the speaker or the extracted or combined text data is converted to voice in the voice converter and then output through the speaker in step S23.

For example, a golfer's log-in is predefined as a situation and three conditions are set for the predefined situation, that is, log-in within 7 days after the last log-in, log-in in 7 to 30 days after the last log-in, and log-in after 30 days after the last log-in. If a golfer satisfies one of the conditions, data corresponding to the condition is extracted from the customized voice storing part or the customized text storing part and output by voice to the golfer (refer to [Table 1]). In this manner, voice guidance is provided to the golfer.

More specifically, predetermined data is extracted or combined for voice guidance and a voice guide is given to the golfer with the extracted or combined data, calling one of a name, a nickname, and an Identifier (ID) of the golfer included in the retrieved golfer data.

The controller determines whether another golfer has logged in to the system in step S30. In the presence of another logged-in golfer, step S25 and its subsequent steps, or step S21 and its subsequent steps are performed.

In this manner, customized voice guidance is provided to individual logged-in golfers, taking characteristics of the logged-in golfers.

Upon completion of the golfer's log-in, the system is initialized for a golf game. After the initialization, the procedure of FIG. 13 is performed. That is, the golf game runs in step S40.

During the game, the controller monitors generation of a predefined situation/condition for the golfer in step S50.

If the golfer is placed in a predefined situation/condition, the controller analyzes the predefined situation/condition for the golfer in step S50a.

Voice data is extracted or combined from the voice data storing part (refer to FIGS. 9 and 11), or text data corresponding to a voice guide is extracted or combined from the customized text storing part (refer to FIG. 10) according to the result of the analysis, in step S50c.

The extracted or combined voice data is output by voice (refer to FIG. 9) or after adjustment (refer to FIG. 11), or the extracted text data is converted to voice and output (refer to FIG. 10), in step S50d.

Steps S50a, S50c and S50d may be further specified depending on what is the predefined situation/condition in step S50. Specific examples of steps S50a, S50c and S50d will be described below with reference to FIGS. 14 and 15.

Steps S50a, S50c and S50d may precede or follow the golfer's play of golf, or both.

After the above steps are completed, the controller stores specifics of the play of the golfer in the golfer data storing part in step S70.

The controller monitors generation of another predefined situation/condition for the golfer and generation of a predefined situation/condition for another golfer in step S80.

That is, the controller determines whether another predefined situation/condition has occurred to the golfer to which voice guidance is provided currently. If there is no further predefined situation/condition for the golfer, the controller determines whether a predefined situation/condition has occurred to another golfer.

Upon generation of another predefined situation/condition for the golfer, steps S50a, S50c and S50d are performed for the golfer. Upon generation of a predefined situation/condition for another golfer, steps S50a, S50c and S50d are performed for the golfer.

For example, on the assumption that three golfers are playing a golf game, one golfer may have another turn to swing after one swing according to a game rule. Preferably, the controller determines whether another predefined situation/condition has occurred to the same golfer, rather than it determines sequentially for each golfer whether a predefined situation/condition has occurred to the golfer. Hence, the controller monitors generation of a predefined situation/condition for every golfer, irrespective of the order of the golfers.

In step S90, if there is not any more predefined situation/condition generated for any golfer, the controller determines whether the game is over and continues or ends the game accordingly.

Figure 14:
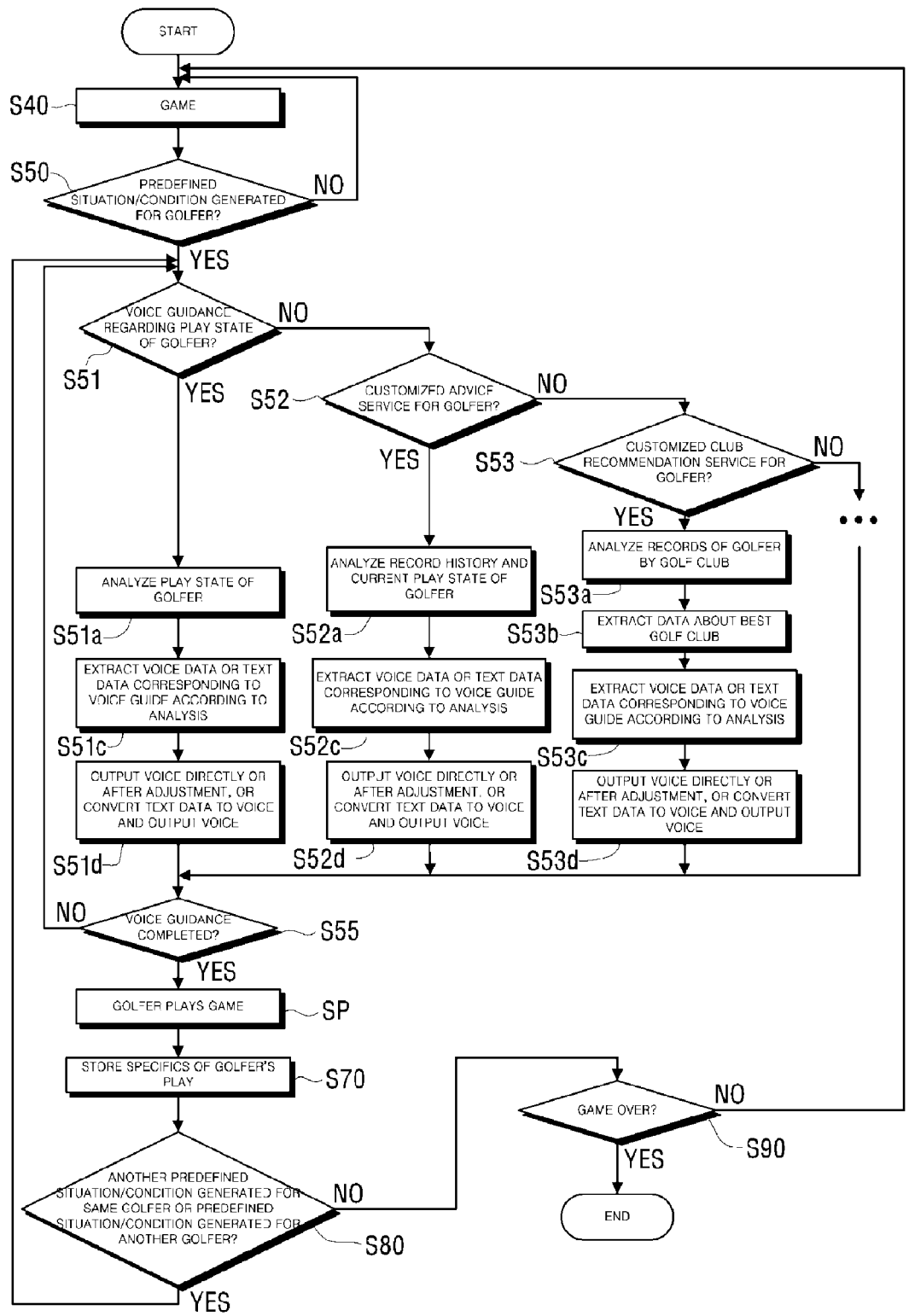
FIG. 14 is a detailed flowchart illustrating the virtual golf simulation method illustrated in FIG. 13 according to an exemplary embodiment of the present invention.

Several examples of the predefined situation/condition detected in step S50 and specified examples of steps S50a, S50c and S50d in the exemplary predefined situations/conditions are illustrated in FIG. 14. The procedure of FIG. 14 is carried out before the golfer's play.

Referring to FIG. 14, during the game in step S40, the controller monitors generation of a predefined situation/condition for the golfer in step S50.

A number of situations and conditions are predefined. These predefined situations/conditions may be categorized largely into situations/conditions to trigger a voice guidance service regarding the play state of the golfer (S51a, S51c and S51d), situations/conditions to trigger a voice guidance service to give customized advice to the golfer (S52a, S52c and S52d), and situations/conditions to trigger a voice guidance service to recommend a golf club suitable for the golfer (S53a, S53b, S53c and S53d).

Now a description will first be made of a case of servicing voice guidance with regard to the play state of the golfer.

The voice guidance concerning the play state of the golfer includes a voice guide about the characteristics of a hole which the golfer is playing on, a recommended swing, and playing characteristics of the golfer on the hole, identified from a play history of the golfer.

For example, a voice guide may be given to the golfer as to whether the golfer should hit a tee shot, an iron shot, a bunker shot, or a rough shot, or the golfer should putt.

Also, it is possible to give precautions by the voice guidance, taking into account whether the golfer had a low score on the hole before.

That is, if the controller determines to service voice guidance as to the play state of the golfer in step S51, the controller extracts necessary data from the golfer data storing part and the system data storing part and analyzes the play state of the golfer in step S51a.

The controller extracts or extracts and combines voice data or text data according to the result of the analysis in step S51c.

In step S51d, the extracted or combined voice data is output by voice or after voice adjustment, or the extracted or combined text data is converted to voice and then output.

Meanwhile, the voice guidance to give customized advice to the golfer involves giving advice to improve the performance of the golfer by voice.

For example, the swing of the golfer is diagnosed and advice is given based on the diagnosis. Or advice is given on aiming a golf ball based on an analysis of ball aiming of the golfer or on a route to take when a shot is to be hit, while notifying a bunker or rough ahead of the golfer.

Specifically, if the controller determines to service voice guidance in order to give customized advice to the golfer in step S52, the controller extracts necessary data from the golfer data storing part and the system data storing part and analyzes the record history or current play of the golfer based on the extracted data in step S52a.

The controller extracts or extracts and combines voice data or text data according to the result of the analysis in step S52c.

In step S52d, the extracted or combined voice data is output by voice or after voice adjustment, or the extracted or combined text data is converted to voice and then output.

Meanwhile, the voice guidance to give customized advice as to a golf club to the golfer involves selecting the most suitable golf club for the golfer and recommending the selected golf club to the golfer by voice in order to improve the performance of the golfer.

For example, if the golfer is currently placed in a situation to make an iron shot, the controller classifies the past records of the golfer by golf club by analyzing all record history of the golfer, selects the best golf club for the current play state of the golfer, and recommends the selected golf club to the golfer by voice guidance.

If the controller determines that although it is typical to use iron club #5, taking into account a driving distance to go, iron club #3 leads to best results according to an analysis of the records of the golfer classified by types of golf clubs from the record history of the golfer, the controller recommends iron club #3 to the golfer by voice guidance.

Specifically, if the controller determines to service voice guidance in order to recommend a customized golf club to the golfer in step S53, the controller extracts necessary data from the golfer data storing part and the system data storing part and analyzes the records of the golfer classified by types of golf clubs based on the extracted data in step S53a. Instead of analyzing all of the record history of the golfer, the records of a predetermined time period may be selectively analyzed.

In step S53b, the controller extracts data about the best golf club for the current play state of the golfer.

The controller extracts or extracts and combines voice data or text data according to the result of the analysis in step S53c.

In step S53d, the extracted or combined voice data is output by voice or after voice adjustment, or the extracted or combined text data is converted to voice and then output.

After the above steps, the controller determines whether the voice guidance has been completed for the predefined situation/condition in step S55. If determining that the voice guidance has been completed, the procedure goes to the next step. On the other hand, if determining that the voice guidance is still going on, steps S51a, S51c and S51d, steps S52a, S52c and S52d, or steps S53a, S53b, S53c and S53d are performed.

Upon completion of the voice guidance for the golfer, the golfer plays the game in step SPECIFIC. After the golfer's play, specifics about the play are stored in the DB in step S70.

In step S80, the controller determines whether the golfer has been placed in another predefined situation/condition and whether another golfer has been placed in a predefined situation/condition.

If the golfer has been placed in another predefined situation/condition, one or more of the sets of steps S51a, S51c and S51d, steps S52a, S52c and S52d, and steps S53a, S53b, S53c and S53d are performed. If the golfer has not been placed in another predefined situation/condition and rather, another golfer has been placed in a predefined situation/condition, one or more of the sets of steps S51a, S51c and S51d, steps S52a, S52c and S52d, and steps S53a, S53b, S53c and S53d are performed for the golfer.

If no further predefined situation/condition has been generated for any golfer, the controller determines whether the game has been over in step S90 and accordingly, continues or ends the game.

Steps S51a, S51c and S51d, steps S52a, S52c and S52d, and steps S53a, S53b, S53c and S53d are mere exemplary applications of situation/condition classifications, which should not be construed as limiting the present invention. Therefore, other steps may be carried out, apart from them.

Figure 15:
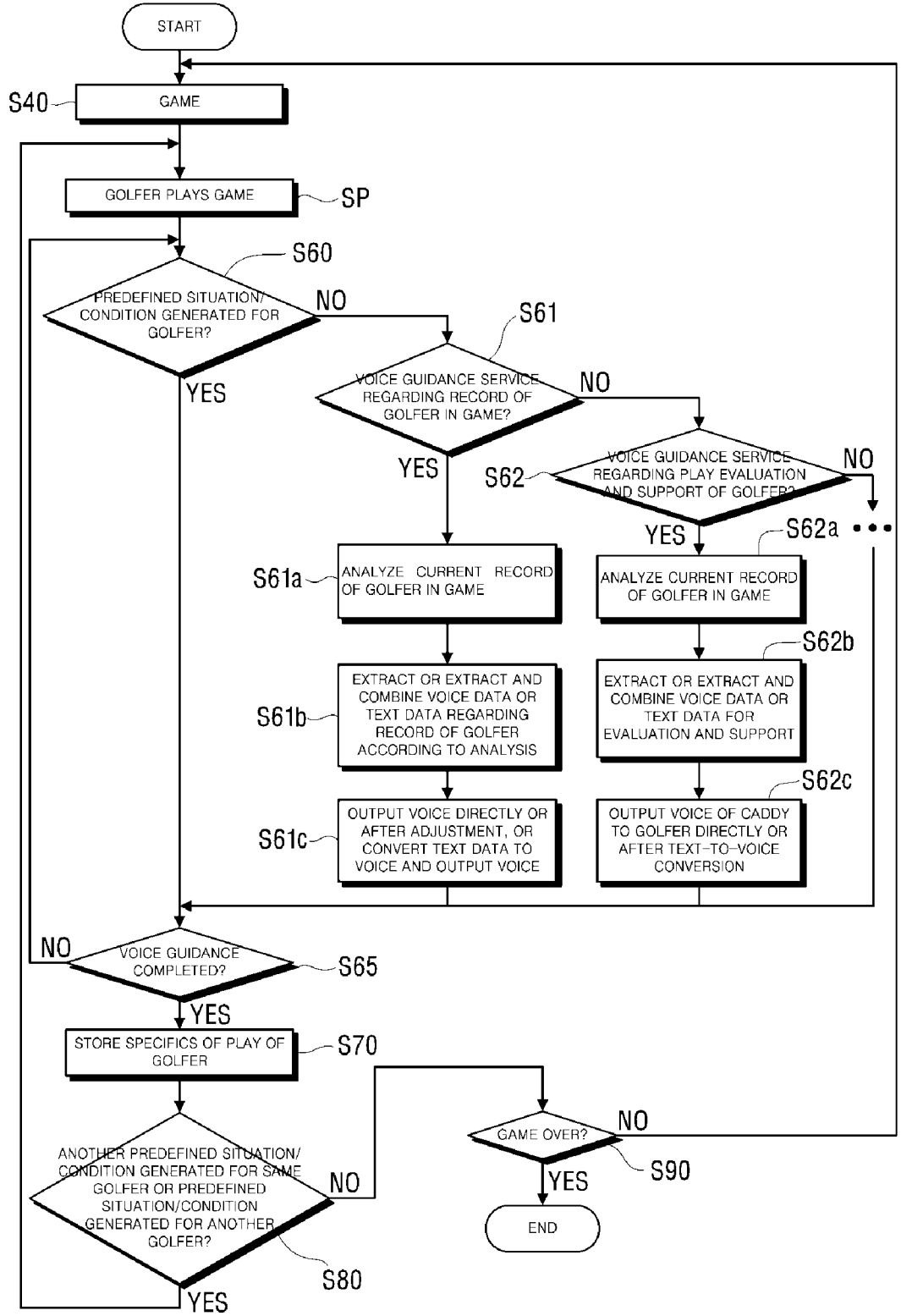
FIG. 15 is a detailed flowchart illustrating the virtual golf simulation method illustrated in FIG. 13 according to another exemplary embodiment of the present invention.

FIG. 15 illustrates an exemplary embodiment of steps performed under predefined situations/conditions that are generated after the golfer plays the game.

Referring to FIG. 15, as the game proceeds in step S40, the golfer plays the game in step SP. In step S60, the controller monitors generation of any predefined situation/condition for the golfer.

A number of situations and conditions are predefined. These predefined situations/conditions may be categorized largely into situations/conditions to trigger a voice guidance service regarding the record of the golfer in the play (S61), and situations/conditions to trigger a voice guidance service as to play evaluation and support of the golfer (S62).

The voice guidance service concerning the play record of the golfer is to announce records of a game that the golfer has played by voice.

For example, when the golfer scores the first birdie or eagle in entire golf games that he has played, or in the current game, the first birdie or eagle is announced by voice, or his final score is announced by voice.

That is, if the controller determines to service voice guidance as to records of the play of the golfer in step S61, the controller analyzes the record history of the golfer and the current play of the golfer based on data extracted from the golfer data storing part and the system data storing part in step S61a.

The controller extracts or extracts and combines voice data or text data according to the result of the analysis in step S61b.

In step S61c, the extracted or combined voice data is output by voice or after voice adjustment, or the extracted or combined text data is converted to voice and then output.

Meanwhile, the voice guidance as to evaluation of the play of the golfer and support of the golfer involves announcing records of the current play of the golfer compared to his past records by voice, or giving a voice complement to the golfer when his play has been improved compared to his past plays, or giving a support voice message to the golfer when his current score is lower than a previous score.

For example, if the current record of the golfer is lower than a previous record, or if the current record of the golfer is lower than other golfers, a support message is output by voice to encourage the golfer.

Specifically, if the controller determines to service voice guidance in order to evaluate records of the play of the golfer or support the golfer in step S62, the controller analyzes the record history of the golfer and the current play specifics and records of the golfer based on data extracted from the golfer data storing part and the system data storing part in step S62a.

The controller extracts or extracts and combines voice data or text data according to the result of the analysis in step S62b.

In step S62c, the extracted or combined voice data is output by voice or after voice adjustment, or the extracted or combined text data is converted to voice and then output.

After the above steps, the controller determines whether the voice guidance has been completed for the golfer in the predefined situation/condition in step S65. If determining that the voice guidance has been completed, the procedure goes to the next step. On the other hand, if determining that the caddy voice guidance is still going on, steps S61a, S61b and S61c, or steps S62a, S62b and S62c are performed.

Upon completion of the voice guidance for the golfer, specifics of the play are stored in the DB in step S70. In step S80, the controller determines whether the golfer has been placed in another predefined situation/condition and whether another golfer has been placed in a predefined situation/condition.

If the golfer has been placed in another predefined situation/condition, one or more of the sets of steps S61a, S61b and S61c and steps S62a, S62b and S62c are performed. If the golfer has not been placed in another predefined situation/ condition and rather, another golfer has been placed in a predefined situation/condition, one or more of the sets of steps S61a, S61b and S61c and steps S62a, S62b and S62c are performed for the golfer.

If no further predefined situation/condition has been generated for any golfer, the controller determines whether the game has been over in step S90 and accordingly, continues or ends the game.

Steps S61a, 561b and S61c and steps S62a, S62b and S62c are mere exemplary applications of situation/condition classifications, which should not be construed as limiting the present invention. Therefore, other steps may be carried out, aside from them.

When a voice guide is given to a golfer, it is preferable that text data corresponding to the voice guide is visually displayed on the screen through the image processor 20, while outputting voice data corresponding to the voice guide, extracted or combined from the customized voice storing part 55 by voice, so that the golfer may view the text of the voice on the screen in each of the virtual golf simulation devices according to the exemplary embodiments of the present invention illustrated in FIGS. 9, 10 and 11.

When a voice guide is given to a golfer, it is also preferable that text data corresponding to the voice guide, extracted or combined from the customized text storing part 57, is visually displayed on the screen through the image processor 20, while converting the extracted or combined text data to voice and outputting the voice, so that the golfer may view the text data on the screen.

MODE FOR THE INVENTION

Various embodiments have been described in the best mode for carrying out the invention.

INDUSTRIAL APPLICABILITY

A virtual golf simulation device and a method for the same according to the present invention are industrially applicable to, for example, a so-called screen golf system, so that a golfer can enjoy virtual golf games. Therefore, interest of the golfer is attracted toward golf and more convenience is provided to the golfer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A virtual golf simulation device for a golfer to play golf on a virtual golf course realized by imaging processing, comprising:

a sensor for sensing flight of a ball hit by the golfer;

an image processor for processing an image of the virtual golf course and a simulated image of a flight trajectory of the ball sensed by the sensor on the virtual golf course;

a database including a text storing part for storing text data corresponding to predetermined voice guides to provide voice guidance to the golfer;

a voice converter for converting predetermined text data among the text data stored in the text storing part to voice; and a controller which simulates a flight trajectory of the ball on the virtual golf course according to the sensing result by controlling the image processor, predefines situations in which a virtual ball of the golfer is placed on the virtual golf course, and identifies a predefined situation generated by the simulating a flight trajectory of the ball on the virtual golf course to trigger voice guidance to the golfer, the controller extracting or combining the predetermined text data according to the identified situation, and outputting the extracted or combined text data as the voice guidance by the voice converter and a speaker, wherein the database further includes a voice data storing part for storing voice data, and the controller determines whether to provide general voice guidance irrespective of a play of the golfer or customized voice guidance relevant to the play of the golfer to the golfer, wherein the controller extracts predetermined voice data from the voice data storing part and outputs the extracted voice data as the general voice guidance by the speaker if the controller determines to provide the general voice guidance, and wherein the controller extracts the predetermined text data from the text data storing part and outputs the extracted text data as the customized voice guidance by the voice converter and the speaker if the controller determines to provide the customized voice guidance.

2. The virtual golf simulation device according to claim 1, wherein the voice converter selectively converts the extracted or combined text data to one of a plurality of voices each having a predetermined timbre, a predetermined pitch, and a predetermined volume.

3. The virtual golf simulation device according to claim 1, further comprising a voice processor for modifying the voice converted by the voice converter so that the voice has a predetermined timbre, a predetermined pitch, and a predetermined volume.

4. The virtual golf simulation device according to claim 1, wherein the database further includes a golfer data storing part for storing data about individual golfers registered to a system, and the controller extracts data about a logged-in golfer from the golfer data storing part and provides customized voice guidance to the logged-in golfer according to characteristics of the logged-in golfer and a game play of the logged-in golfer.

5. The virtual golf simulation device according to claim 4, wherein the text storing part stores text data for customized voice guidance to the golfer as classified according to predefined situations or conditions, and if the golfer is placed in a predefined situation or condition according to the game play of the golfer, the controller extracts text data from the text storing part according to the predefined situation or condition and outputs the extracted text data to the voice converter.

6. The virtual golf simulation device according to claim 1, wherein the controller is configured to predefine at least one condition under each predefined situation so as to provide the voice guidance to the golfer when the virtual ball on the virtual golf course is placed in a predefined situation and a predefined condition under the situation is satisfied, and wherein the controller combines text data extracted from the text storing part according to the predefined condition and outputs the combined text data to the voice converter when a predefined condition under a predefined situation is satisfied.

7. The virtual golf simulation device according to claim 1, wherein the controller visually displays the extracted or combined text data through the image processor, while providing the voice guidance to the golfer using the extracted or combined text data.

8. A virtual golf simulation method for a golfer to play golf on a virtual golf course realized by imaging processing, comprising:

sensing by a sensor flight a ball hit by the golfer;

simulating by a controller a flight trajectory of the ball on the virtual golf course according to the sensing result;

predefining by the controller situations in which a virtual ball of the golfer is placed on the virtual golf course;

identifying a predefined situation or a predefined condition under a predefined situation generated by the simulating a flight trajectory of the ball on the virtual golf course to provide voice guidance to the golfer;

extracting or combining predetermined text data from a text storing part for storing text data for the voice guidance according to the identified situation or the predefined condition;

providing the golfer with the voice guidance by converting the extracted or combined text data to voice by a voice converter and outputting the voice by a speaker determining by the controller whether to provide general voice guidance irrespective of a play of the golfer or customized voice guidance relevant to the play of the golfer to the golfer;

extracting predetermined voice data from a voice data storing part and outputting the extracted voice data as the voice general guidance by the speaker if the controller determines to provide the general voice guidance; and extracting the predetermined text data from the text data storing part and outputs the extracted text data as the customized voice guidance by the voice converter and the speaker if the controller determines to provide the customized voice guidance.

9. The virtual golf simulation method according to claim 8, further comprising selecting one of a plurality of voices each having a predetermined timbre, a predetermined pitch, and a predetermined volume, for the voice guidance to the golfer, and the provision of the golfer with voice guidance comprises converting the extracted text data to the selected voice and outputting the selected voice.

10. The virtual golf simulation method according to claim 8, wherein the provision of the golfer with voice guidance comprises:

converting the extracted or combined text data to the voice; and adjusting the converted voice so that the converted voice has a predetermined timbre, a predetermined pitch, and a predetermined volume.

11. The virtual golf simulation method according to claim 8, further comprising:

extracting data about the golfer logged in a system using the virtual golf simulation method from a golfer data storing part and individually identifying the golfer based on the extracted data; and providing the golfer with customized voice guidance according to a predefined situation or condition in which the golfer is placed during a game.

12. The virtual golf simulation method according to claim 11, wherein the provision of the golfer with customized voice guidance comprises:

extracting or combining predetermined data for voice guidance, using one of a name, nickname, and identifier of the golfer included in the extracted data about the golfer, as a title; and providing the golfer with the customized voice guidance using the title and the extracted or combined data.

13. The virtual golf simulation method according to claim 11, wherein the provision of the golfer with the customized voice guidance comprises:

determining whether a predefined situation or condition regarding a play state of the golfer has been generated;

analyzing the play state of the golfer based on at least one of the data about the golfer, data about the virtual golf course in which the golfer is playing the game, data about an environment of a current hole being played, and data about a progress state of the game, if a predefined situation or condition regarding a play state of the golfer has been generated; and providing the golfer with voice guidance regarding the play state of the golfer based on the analysis according to the predefined situation or condition.

14. The virtual golf simulation method according to claim 11, wherein the provision of the golfer with the customized voice guidance comprises:

determining whether a predefined situation or condition regarding a record of the golfer has been generated after the golfer plays the game;

analyzing a record history of the golfer and a current record of the golfer in the game, if the predefined situation or condition regarding the record of the golfer has been generated, after the golfer plays the game; and providing the golfer with voice guidance regarding the record of the golfer according to the predefined situation or condition based on the analysis.

15. The virtual golf simulation method according to claim 11, wherein the provision of the golfer with the customized voice guidance comprises:

determining whether a predefined situation or condition to trigger customized advice regarding a play of the golfer has been generated;

analyzing the play of the golfer based on at least one of the data about the golfer, data about records of the golfer, data about the virtual golf course in which the golfer is playing the game, data about an environment of a current hole being played, and data about a play state of the golfer, if the predefined situation or condition to trigger customized advice regarding the play of the golfer has been generated; and providing the golfer with customized voice guidance by giving customized voice advice to the golfer according to the predefined situation or condition based on the analysis.

16. A virtual golf simulation method for a golfer to play golf on a virtual golf course realized by imaging processing, comprising:

sensing by a sensor flight a ball hit by the golfer;

simulating by a controller a flight trajectory of the ball on the virtual golf course according to the sensing result;

predefining by the controller situations in which a virtual ball of the golfer is placed on the virtual golf course;

identifying a predefined situation or a predefined condition under a predefined situation generated by the simulating a flight trajectory of the ball on the virtual golf course to provide voice guidance to the golfer;

extracting or combining predetermined text data from a text storing part for storing text data for the voice guidance according to the identified situation or the predefined condition;

providing the golfer with the voice guidance by converting the extracted or combined text data to voice by a voice converter and outputting the voice by a speaker determining by the controller whether to provide general voice guidance irrespective of a play of the golfer or customized voice guidance relevant to the play of the golfer to the golfer;

extracting predetermined voice data from a voice data storing part and outputting the extracted voice data as the voice general guidance by the speaker if the controller determines to provide the general voice guidance;

extracting the predetermined text data from the text data storing part and outputs the extracted text data as the customized voice guidance by the voice converter and the speaker if the controller determines to provide the customized voice guidance;

extracting data about the golfer logged in a system using the virtual golf simulation method from a golfer data storing part and individually identifying the golfer based on the extracted data; and providing the golfer with customized voice guidance according to a predefined situation or condition in which the golfer is placed during a game, wherein the provision of the golfer with the customized voice guidance comprises:

determining whether a predefined situation or condition to trigger customized golf club recommendation regarding a play of the golfer has been generated;

analyzing the golfer's records classified by types of golf clubs, or the records during a predetermined time period, based on the data about the golfer and data about records of the golfer, if the predefined situation or condition to trigger customized golf club recommendation regarding the play of the golfer has been generated;

extracting data about a golf club customized for a current play state of the golfer according to the analysis; and providing the customized recommendation to the golfer based on the extracted data about the golf club according to the predefined situation or condition by voice.

17. The virtual golf simulation method according to claim 11, wherein the provision of the golfer with the customized voice guidance comprises:

determining whether a predefined situation or condition has been generated for the golfer;

analyzing the predefined situation or condition based on at least one of the data about the golfer retrieved from the golfer data storing part, sensed data about strokes by the golfer, data retrieved from a system data storing part that stores system data about a golf course and an environment of a current hole being played, sensed data about a swing of the golfer, sensed data about an impact state of the ball, and data about an environment changed by a manipulation of an operator, if the predefined situation or condition has been generated for the golfer; and providing the golfer with voice guidance according to the predefined situation or condition based on the analysis.

18. The virtual golf simulation method according to claim 11, wherein the provision of the golfer with the customized voice guidance comprises:

determining whether a predefined situation has been generated for the golfer during the game;

determining whether a predefined condition is satisfied in the predefined situation, if the predefined situation has been generated for the golfer during the game; and providing the golfer with voice guidance according to the predefined condition of the predefined situation, if the predefined condition is satisfied in the predefined situation.

19. The virtual golf simulation method according to claim 18, wherein the provision of the golfer with the customized voice guidance further comprises:

determining whether a plurality of predefined conditions are satisfied in the predefined situation has been generated for the golfer; and selecting a predefined condition from among the plurality of predefined conditions according to their priority levels, if the plurality of predefined conditions are satisfied in the predefined situation.

* * * * *